(12) United States Patent
Dole

(10) Patent No.: US 6,634,008 B1
(45) Date of Patent: Oct. 14, 2003

(54) METHODOLOGY SERVER BASED INTEGRATED CIRCUIT DESIGN

(75) Inventor: Harry Dole, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/478,978

(22) Filed: Jan. 6, 2000

Related U.S. Application Data

(60) Provisional application No. 60/140,528, filed on Jun. 20, 1999.

(51) Int. Cl.$^7$ .............................. G06F 17/50; G06F 7/00; G06F 17/00
(52) U.S. Cl. ............................ 716/1; 707/104.1; 707/10
(58) Field of Search .......................... 716/1; 707/104.1, 707/10

(56) References Cited

U.S. PATENT DOCUMENTS

| | | | | |
|---|---|---|---|---|
| 5,710,883 A | * | 1/1998 | Hong et al. .................. 709/246 |
| 5,801,958 A | * | 9/1998 | Dangelo et al. ............... 716/18 |
| 5,867,712 A | * | 2/1999 | Shaw et al. .................. 395/704 |
| 5,950,201 A | * | 9/1999 | Van Huben et al. .......... 707/10 |
| 5,953,731 A | * | 9/1999 | Glaser ........................ 707/513 |
| 5,956,487 A | * | 9/1999 | Venkatraman et al. ....... 709/218 |
| 5,966,516 A | * | 10/1999 | De Palma et al. ............. 703/1 |
| 5,983,277 A | * | 11/1999 | Heile et al. .................. 709/232 |
| 5,999,972 A | * | 12/1999 | Gish ........................... 709/219 |
| 6,023,565 A | * | 2/2000 | Lawman et al. ............... 716/1 |
| 6,064,977 A | * | 5/2000 | Haverstock et al. ........... 705/9 |
| 6,080,204 A | * | 6/2000 | Mendel ........................ 716/7 |
| 6,102,961 A | * | 8/2000 | Lee et al. .................... 716/1 |
| 6,108,760 A | * | 8/2000 | Mirsky et al. ............... 711/203 |
| 6,125,384 A | * | 9/2000 | Brandt et al. ................ 709/203 |
| 6,139,177 A | * | 10/2000 | Venkatraman et al. ........ 700/83 |
| 6,144,962 A | * | 11/2000 | Weinberg et al. ............. 707/10 |
| 6,144,988 A | * | 11/2000 | Kappel ....................... 709/202 |
| 6,253,358 B1 | * | 6/2001 | Takahashi ..................... 716/6 |
| 6,260,083 B1 | * | 7/2001 | Moore et al. ................. 710/33 |
| 6,292,802 B1 | * | 9/2001 | Kessenich et al. .......... 707/101 |
| 6,336,137 B1 | * | 1/2002 | Lee et al. .................... 709/219 |
| 6,338,112 B1 | * | 1/2002 | Wipfel et al. ............... 710/269 |
| 2001/0014839 A1 | * | 8/2001 | Belanger et al. ............ 700/245 |
| 2001/0018707 A1 | * | 8/2001 | Seta ........................... 709/218 |
| 2001/0042237 A1 | * | 11/2001 | Chang et al. .................. 716/8 |
| 2001/0047465 A1 | * | 11/2001 | Liu ............................. 712/43 |
| 2001/0055407 A1 | * | 12/2001 | Rhoads ....................... 382/100 |

OTHER PUBLICATIONS

P. Schindler et al., IP Repository, a Web based IP Reuse Infrastructure, Proceedings of the IEEE Custom Integrated Circuits, pp. 415–418, May 1999.*

D. Saha et al., A Framework for Distributed Web–based Microsystem Design, Sixth IEEE Workshops on Enabling Technologies: Infrastructure for Collaborative Enterprises, pp. 69–74, Jun. 1997.*

J. Pazdziora, Converting Web Applications to Data Components: Design Methodology, 25$^{th}$ Annual International Computer Software and Applications Conference, pp. 31–36, Oct. 2001.*

(List continued on next page.)

*Primary Examiner*—Matthew Smith
*Assistant Examiner*—A. M. Thompson
(74) *Attorney, Agent, or Firm*—Christie, Parker & Hale, LLP

(57) ABSTRACT

An environment for designing integrated circuits. Computers include browsers for displaying pages of forms, with the computers in communication with a methodology server and a compute server. The methodology server contains design methodologies accessed by the computers, with the design methodologies defining steps of designing and testing of integrated circuits. The computers or methodology server are also in communication with a compute server. The compute server executes electronic design automation tools as requested.

42 Claims, 30 Drawing Sheets

OTHER PUBLICATIONS

L. Geppert, IC Design on the World Wide Web, IEEE Spectrum, pp. 45–50, Jun. 1998.*

P. Wilsey, Web–based Analysis and Distributed IP, Proceedings of the Winter Simulation Conference on Winter Simulation, pp. 1445–1453, Dec. 1999.*

R. Kramer, Databases on the Web: Technologies for Federation Architectures and Case Studies, Proceedings of the ACM SIGMOD International Conference on Management of Data, pp. 503–506, Jun. 1997.*

D. Saha, Web–based Distributed VLSI Design, Eleventh International Conference on VLSI Design, pp. 494–454, Jul. 1997.*

A.M. Madni et al., An Adaptive Wide–area Design Process manager for Collaborative Multichip Module Design, pp. 63–72, Feb. 1997.*

M. Dalpasso, Virtual Simulation of Distributed IP–based Designs, Proceedings of the 36th ACM/IEEE Conference on Design Automation, pp. 50–55, Jun. 1999.*

Standard Developer Suite. Product Brochure [online]. Synchronicity Corporation. [retrieved on Dec. 10, 2002]. Retrieved from the Internet:<http://www.synchronocity.com/products/developer/standard/standard.htm>.*

Publisher & Consumer Suites with IP Gear. Product Brochure [online]. Synchronocity Corporation [retrieved on Dec. 10, 2002]. Retrieved from the Internet:<http://www.synchronocity.com/products/developer/standard/standard.htm>.*

L. Joselyn, Blocks Away, New Electronics, pp. 33–34, Sep. 2002.*

Curatelli, F., et al., "A CGI tool for multiple access to VHDL CAD tools", Abstract http://ww.isima.fr/scs/websim/wsim11/abstract.html, printed Jan. 17, 2000, publication date not known, pp. 1, 2.

Santarini, "Monterey launches bold Internet EDA play", EE Times, Mar. 9, 2000, Internet papers: http://www.eetimes.com/story/OEG20000308S0053, pp. 1–5.

Goering, "EDA startup Genedax to liquidate assets", EE Times, Feb. 15, 2000, Internet papers:hhttp://www.eetimes.com/story/OEG20000215S0027, pp. 1–3.

* cited by examiner

Available Tools

[ DELETE ]  [ EDIT ]  Cadenuce-nc_verilog-1.22

[ DELETE ]  [ EDIT ]  Cadenuce-Oyster-1.1s05

[ DELETE ]  [ EDIT ]  Metamorphisis-DV_build-V 2.5

FIG. 11

METHODOLOGIES

FIG. 12

SELECT THE METHODOLOGY TO WORK ON:

| ACTION | | NAME | DESCRIPTION | OWNER |
|---|---|---|---|---|
| EDIT | DELETE | CCGENERATION | COMPILED CELL GENERATION METHODOLOGY | |
| EDIT | DELETE | EXAMPLE FLOW | EXAMPLE FLOW FOR TESTING | |
| EDIT | DELETE | FRAME GENERATION | I/O FRAME GENERATION METHODOLOGY | |
| EDIT | DELETE | FRONTENDPOST | FRONT-END POST LAYOUT METHODOLOGY | |
| EDIT | DELETE | MGC_ATPG | MENTOR GRAPHICS ATPG FLOW | |
| EDIT | DELETE | SC_HIER_BACKEND | STANDARD CELL HIERARCHICAL BACKEND | |
| EDIT | DELETE | SC_HIER_IMPL | STANDARD CELL FULL FLOW | |
| EDIT | DELETE | TALISKER | STANDARD CELL BASELINE METHODOLOGY | |

SUB-METHODOLOGIES ARE CALLED BY THE FULL METHODOLOGIES, AND CAN NOT THEMSELVES BE ASSIGNED A BLOCK. PLEASE SELECT A SUB-METHODOLOGY TO WORK ON.

| ACTION | | NAME | DESCRIPTION | OWNER |
|---|---|---|---|---|
| EDIT | DELETE | DELAYCALCULATION | DELAY CALCULATION SUB-METHODOLOGY | |
| EDIT | DELETE | DESIGNVERIFY 2 | FORMAL VERIFICATION SUB-METHODOLOGY | |
| EDIT | DELETE | FRONTENDPRE | /ENER/METH/FRONTENDPRE/FRONTENDPRE.CIG?ACTION=INFO. | |
| EDIT | DELETE | GATESIM | GATE SIMULATION SUB-METHODOLOGY | |

STEPS FOR AUTOMATIC FILE COMPRESSION / DECOMPRESSION

FILE EDITING

FastChip Home Page

- Customer Information
    - Customer: ATOD
    - Customer Project Name: G38
    - Customer Part Number: TQ43125.1

- Blocks

No Current top block has been choosen.

Please use the following form to set the top block name for this chip.

Choose the top block name: | Block 1 | 

| Actions | Block | Created By | Date | Methodologies in use |
|---|---|---|---|---|
| DELETE | Block 1 | dpfiveq | 13:27:33 6/1/99 | SQ_Hie_FrontEnd |
| DELETE | Block 3 | Ace | 14:10:40 6/5/99 | Heierchal SQ Frontend |

<u>Information Required for 0.25 um Process</u>

Temperature: [         ]

FIG. 19

Block1 Block Home Page

- Methodologies Used on This Block
    Hierarchical
    SQ_Hier_FrontEnd
    SQ_Heir_Impl Use this link to add a methodology to this block

| Use These | Reference Blocks |
|---|---|
| [X] | Block 2 |
| [ ] | Block 3 |
| [ ] | Testing 123 |

| Submit Query | Reset |

FIG. 20

Available Processes

| Date | Name | Version |
|------|------|---------|
| 5/5/99 | .35um | 1.1 |
| 7/4/99 | .25um | 1.4 |

FIG. 21

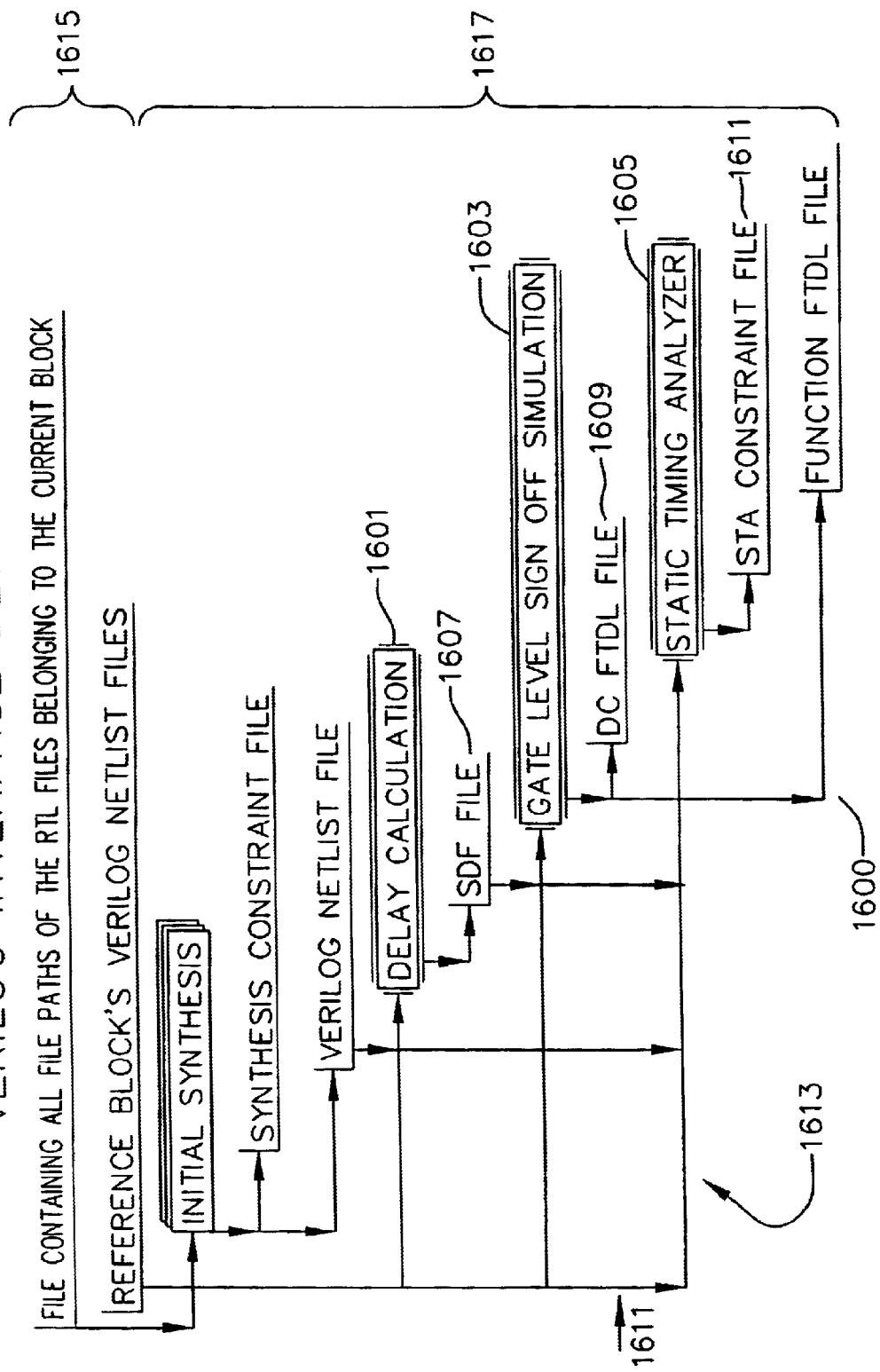
FIG. 23 VERILOG INTERFACE DESIGN FLOW

FIG. 24

VERILOG NETLIST FILE
NAME F1VERINETLIST
TYPE FILE

DOCUMENTATION:
THIS FILE STEP MEAN THE VERILOG NETLIST FILES FOR THE THIS BLOCK.($::BLOCKNAME)

FILE INFORMATION:

WEB PATH IS/ENGR/CHIP/SAMCHER/BLOCK/BLOCK 1.

THIS FILE IS RELATIVE TO THE BLOCK DIRECTORY USING THE PATTERN:
TRANSFER/NL/INIT/OVI−VERILOG−V1.0/$::BLOCKNAME.V

[EDIT] EDIT THE GLOBING PATTERN TRANSFER/NL/INIT/OVI−VERILOG−V1.0/BLOCK1.V

| FILE NAME | TIME LAST MODIFIED | SIZE | DESCRIPTION |
|---|---|---|---|
| [EDIT] TRANSFER/NL/INIT/OVI−VERILOG−V1.0/BLOCK1.V | WED MAR 24 13:04:47 1999 | 8664 | EXECUTABLE PLAIN TEXT READABLE WRITABLE |

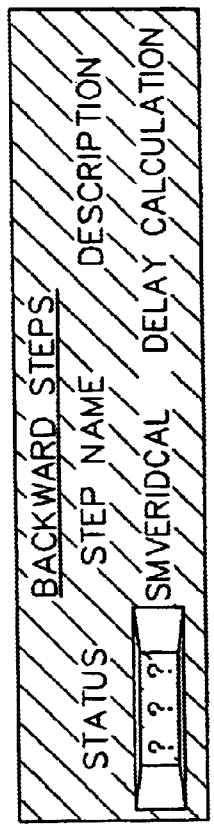

RELATED STEPS:

FORWARD STEPS
STATUS  STEP NAME  DESCRIPTION
[ ? ? ? ]  SMVERIDCAL  DELAY CALCULATION

FIG.25

EDITING TRANSFER/NL/INIT/OVI-VERILOG-V1.0/BLOCK1.V

DESCRIPTION: VERILOG NETLIST FILE
FILE NAME: TRANSFER/NL/INIT/OVI-VERILOG-V1.0/BLOCK1.V
HOST NAME: INDIA

WATCH THE LAUNCH LOG FILE IN A NEW BROWSER WINDOW.
WATCH THE EDITOR'S LOG FILE IN A NEW BROWSER WINDOW.

[FOUND]  VERILOG NETLIST FILE

```
MODULE TOP ( CLK, COUNT, RESET, ZERO_N, INV_IN, INV_OUT );
INOUT   [3:0] COUNT;
OUTPUT  [7:0] RESULT;
INPUT CLK, RESET_N, INV_IN;
OUTPUT ZERO_N, INV_OUT;
  WIRE NET_CLK, NET_RESET_N, NET_COUNT_3A, NET_ENABLE, NET_INV_INT2_21A,
NET_INI_INT2_12A, NET_INV_INT2_31A, NET_INV_INT2_28A, NET_COUNT_1A,
NET_MLTB_2A,NET_INV_INT2_25A,NET_INV_2_16A,NET_MLTB_0A,NET_BUF1,
NET_ZERO_N,NET_INV_INT2_27A,NET_INV_INT2_14A,NET_INV_INT2_19A,
NET_RESULT_7A,NET_RESULT_5A,NET_RESULT_4A,NET_DIN_1A,
NET_INV_INT2_23A,NET_INV_INT2_10A,NET_INV_INT1_26A,NET_INV_INT1_15A,
NET_INV_INT1_4A,NET_INV_INT2_7A,NET_RESULT_2A,NET_RESULT_0A,
NET_INV_INT1_18A,NET_INV_INT1_9A,NET_INV_INT1_22A,NET_INV_INT1_11A,
NET_INV_INT1_0A,NET_INV_INT2_3A,NET_INV_INT1_20A,NET_INV_INT1_13A,
NET_INV_INT1_2A,NET_INV_INT2_1A,NET_BUF_IN,NET_INV_INT1_30A,
NET_INV_INT1_29A,NET_INV_INT2_8A,NET_DIN_3A,NET_INV_INT1_24A,
NET_INV_INT1_17A,NET_INV_INT1_6A,NET_INV_INT2_5A,NET_RESULT_3A,
NET_DIN_2A,NET_INV_INT1_25A,NET_INV_INT1_16A,NET_INV_INT1_7A,
NET_INV_INT2_4A,NET_INV_INT1_21A,NET_INV_INT1_12A,NET_INV_INT1_3A,
NET_INV_INT2_0A,NET_BUF2,NET_INV_INT1_31A,NET_INV_INT1_28A,
NET_INV_INT2_9A,NET_INV_INT1_19A,NET_INV_INT1_8A,NET_COUNT_2A,
NET_COUNT_0A,NET_MLTB_1A,NET_RESULT_5A,NET_RESULT_1A,NET_DIN_0A,
NET_INV_INT1_23A,NET_INV_INT1_10A,NET_INV_INT2_11A,NET_INV_INT2_2A,
NET_INV_INT1_27A,NET_INV_INT1_14A,NET_INV_INT2_22A,NET_INV_INT2_6A,
NET_INV_INT2_26A,NET_INV_INT2_15A,NET_MLTB_3A,NET_INV_OUT_31A,
NET_INV_INT2_17A,NET_INV_INT2_20A,NET_INV_INT2_13A,NET_INV_INT2_30A,
NET_INV_INT2_29A;
  WIRE SYNOPSYS_UNCONNECTED_1,SYNOPSYS_UNCONNECTED_2,
SYNOPSYS_UNCONNECTED_3,SYNOPSYS_UNCONNECTED_4,SYNOPSYS_UNCONNECTED_5
SYNOPSYS_UNCONNECTED_6,SYNOPSYS_UNCONNECTED_7,SYNOPSYS_UNCONNECTED_8
```

REPORT A PROBLEM

| | |
|---|---|
| USER MAKING THE REPORT: | HARRY HENDERSON |
| LOGIN NAME: | HARRY |
| E-MAIL ADDRESS: | HARRY@HOME.COM |
| SERVER NAME: | ORION |

PROBLEM REPORT FORM

1. SELECT THE TYPE OF REPORT:

◉ BUG
THE SYSTEM IS <u>NOT</u> WORKING AS IT SHOULD.

○ ENHANCEMENT
THE SYSTEM NEEDS TO DO <u>MORE</u>.

2. SUBJECT:

[                    ]

ENTER A SHORT DESCRIPTION OF THE PROBLEM.

3. URL:

[ http:// YOURURL.COM/ENGR/METH/FRONTENDPRE/FRONTENDPRE.CIG?ACTION*EDITFILE&CHIPNAR ]

GIVE EITHER THE URL FOR THE BAD WEB PAGE, OR THE PAGE THAT YOU CLICK ON TO GET TO THE BAD WEB PAGE. FOR PAGES WITH FORMS, BE SURE TO GIVE YOUR ENTRIES ON THE FORM IN THE DESCRIPTION AREA BELOW.

4. SELECT THE PRIORITY LEVEL FOR THIS REPORT:

○ EMERGENCY   ○ CRITICAL   ◉ NORMAL   ○ LOW
I NEED AN ANSWER NOW!  I QUICKLY NEED AN ANSWER!  GET BACK TO ME SOON.  GET BACK TO ME LATER.

FIG.28

POWER PLANNING

NAME SE_POWERPLANNING
TYPE FLOW

DOCUMENTATION

ABOUT POWER SUPPLY LAYOUT FOR BLOCK

THE IMAGE OF POWER SUPPLY LAYOUT FOR THE BLOCK IS:
(1) CUT OUT THAT OF CHIP INSIDE OF CORERING WHICH IS INDICATED WITH RED SLASH.
(2) MAKE THE BLOCK BOUNDRY AND THE POWER SUPPLY PIN FOR THE CUTOUT EDGE.

[SILICON ENSEMBLE] FLOORPLAN->RESET FLOORPLAN...

X DELETE ALL REGULAR WIRES
X DELETE ALL SPECIAL WIRES
CLICK OK

[SILICON ENSEMBLE] ROUTE->PLAN POWER...

METHODOLOGY SERVER BASED INTEGRATED CIRCUIT DESIGN

This application claims the benefit of the filing date of U.S. provisional application 60/140,528 filed Jun. 20, 1999, the disclosure of which is incorporated herein by reference.

BACKGROUND OF THE INVENTION

This application relates generally to integrated circuit design systems and methods, and more particularly to an environment for designing integrated circuits.

Integrated circuits have become increasingly complex, and perform ever increasing functions. Indeed, integrated circuits on a single chip now often perform functions which were previously performed by sets of chips or even by one or multiple circuit boards. As single chip integrated circuits now perform functions previously performed by entire systems, these single chips integrated circuits are sometimes referred to as system-on-chip (SOC).

Complex integrated circuits, particularly SOCs, are often designed in terms of blocks, with a number of blocks making up the integrated circuit. The large number of blocks on a single chip, and the complexity of each of the blocks, increases the difficulty of the design and test of the integrated circuit as a whole. FIG. 1, for example, is an illustration of an integrated circuit 100. As shown, the integrated circuit (IC) consists of multiple interconnected blocks 101, 103, 105, 107, 109, 111. Each block typically contains complex circuitry performing complex functions. As illustrated, the integrated circuit of FIG. 1 contains six blocks. In actuality, an integrated circuit will generally contain many more blocks than illustrated, and will include PAD and PORT cells for the reception and transmission of signals from and to the integrated circuit. The use of six blocks in the integrated circuit 100 of FIG. 1 is meant to illustrate that an integrated circuit 100 may contain a plurality of blocks. Block 1 101 of the integrated circuit of FIG. 1 is a block designed and tested specifically for the integrated circuit. Block 2 103 is a block provided by a third party supplier. Block 3 105 is a proprietary block reused from another design from the same manufacturer, and block 4 107 is a block designed and tested by a remote design team. Thus, the integrated circuit of FIG. 1 includes blocks developed specifically for the integrated circuit 101, blocks derived from third party sources, blocks previously developed in-house 105, and blocks designed by remote design teams 107.

For the integrated circuit to function properly each of the blocks must work with the other blocks in an integrated fashion. In addition, it is desirable that operation of the integrated circuit 100 as a whole be verified prior to actual construction of the physical circuit. Accordingly, each of the blocks must be supported by a testing tool used to verify the functionality of the integrated circuit as a whole. In other words, the methodologies used in the design and tests of each of the blocks independently should preferably have been done using the same methodologies, and at a minimum must have been accomplished using non-contradictory methodologies.

Use of contradictory methodologies is likely to result in substantial rework further along in the design process. For example, a chip may be designed using a specific file format for mask layers. A remote design team, however, may provide a block using a different file format for the mask layer, resulting in an unuseable block.

In order to design and test such an integrated circuit in a timely manner, multiple design teams in geographically distant locations may be used to implement and test the design. In addition, it is desirable to reuse existing blocks, sometimes referred to as block intellectual property (IP), in order to decrease design time and to reduce design associated costs. When implementing a design containing 10,000,000 to 25,000,000 gates, reuse and modification IP blocks become increasingly attractive. Once a block has been developed at great expense and effort it is desirable to reuse that block at a later time.

The use of geographically distant design teams and the reuse of block IP presents several problems. A number of design tools, or methodologies, are available to assist designers in the design process, and the complexity of the designs often mandates the use of such tools. The use of different tools by different design teams during the design process may result in an unusable design. Similarly, the design and test of previously designed blocks may also have utilized different tools, also resulting in an unusable design. Further, design and test tools often require that certain environmental parameters be assigned. Use of the same tools, but with differing environmental parameters, may also result in unworkable or unusable designs.

The determination of the tools and environmental parameters to use in designing an integrated circuit require a great deal of skill and knowledge, often gained by experience. Thus, the use of the tools is sometimes hampered if an individual designer does not have sufficient experience with the various tool sets or their use. Accordingly, design teams often heavily rely on a few specific highly skilled individuals to determine the design flow. The loss of such highly skilled personnel during the design process may inordinately impair the effectiveness of the design team and result in delays in producing the integrated circuit. Work on further integrated circuits may also be delayed due to the lack of a sufficient number of highly skilled personnel.

The use of geographically distant design teams and the use of IP blocks, which may have been developed by third party developers, also presents management problems. The use of distant design teams may result in difficulties in accurately assessing the progress of the various design teams and their allotted tasks. Monitoring the design teams to ensure that the appropriate tools and environmental parameters are being used is also difficult.

SUMMARY OF THE INVENTION

The present invention therefore provides an environment for designing integrated circuits. In one embodiment the present invention comprises an integrated design environment for the design and test of integrated circuits, the integrated circuits being comprised of blocks. The integrated design environment includes a plurality of computers, with the computers including a browser for the display of pages including forms. The integrated design environment also includes at least one methodology server in communication with the plurality of computers. The methodology server includes a page generator generating the pages including forms and additionally including programs responsive to submission of information from the computers using the pages including forms. In one embodiment the programs responsive to submission of information comprise common gateway interface (CGI) programs or scripts. The integrated design environment also includes at least one compute server in communication with the methodology server. The compute serve includes an electronic automation tool, and the compute server executes the electronic design automation tool in response to a request generated by a program resident on the methodology server.

In one embodiment the pages including forms include methodology capture pages. Methodology pages are used to capture executable methodologies. In another embodiment the methodologies have steps the steps including submethodologies, ad the methodologies are attached to blocks of which the integrated circuit is comprised.

Many of the attendant features of this invention will be more readily appreciated as the same becomes better understood by reference to the following detailed description considered in connection with the accompanying drawings.

DESCRIPTION OF THE DRAWINGS

FIG. 11 illustrates a screen showing a sample of available tools;

FIG. 12 is a block diagram illustrating a process of designing a block by executing methodologies using the interface and flow control tool;

FIG. 19 is an illustration of a chip's home page;

FIG. 20 is an illustration for a block's home page;

FIG. 21 illustrates a sample page showing available processes;

FIG. 23 illustrates a sample design flow for a methodology having multiple steps;

FIG. 24 illustrates an editable file step;

FIG. 25 illustrates the examination of file contents in a pop up window;

FIG. 26 shows an embodiment of a screen that is used to report problems encountered while engaged in the design process;

FIG. 28 shows an embodiment of the screen used for power planning;

DETAILED DESCRIPTION

I. Overview

Figure 1:
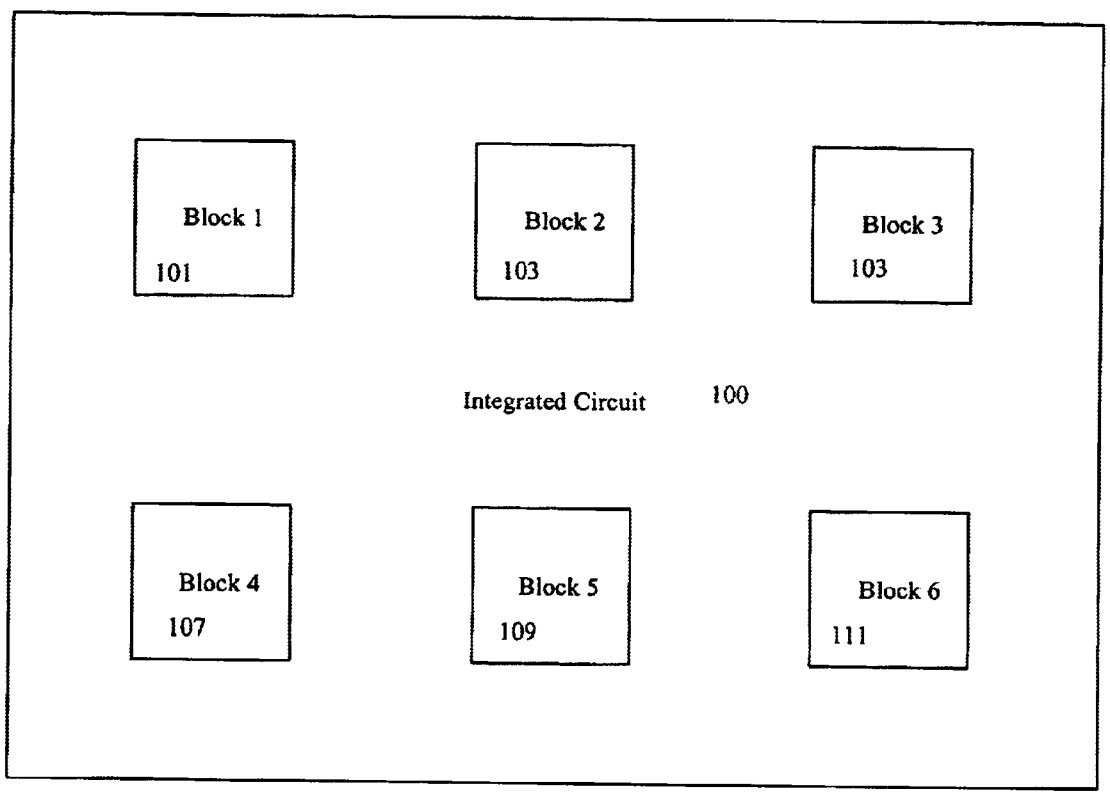
FIG. 1 is a representation showing integrated circuit blocks arranged on an integrated circuit substrate.
Figure 2:
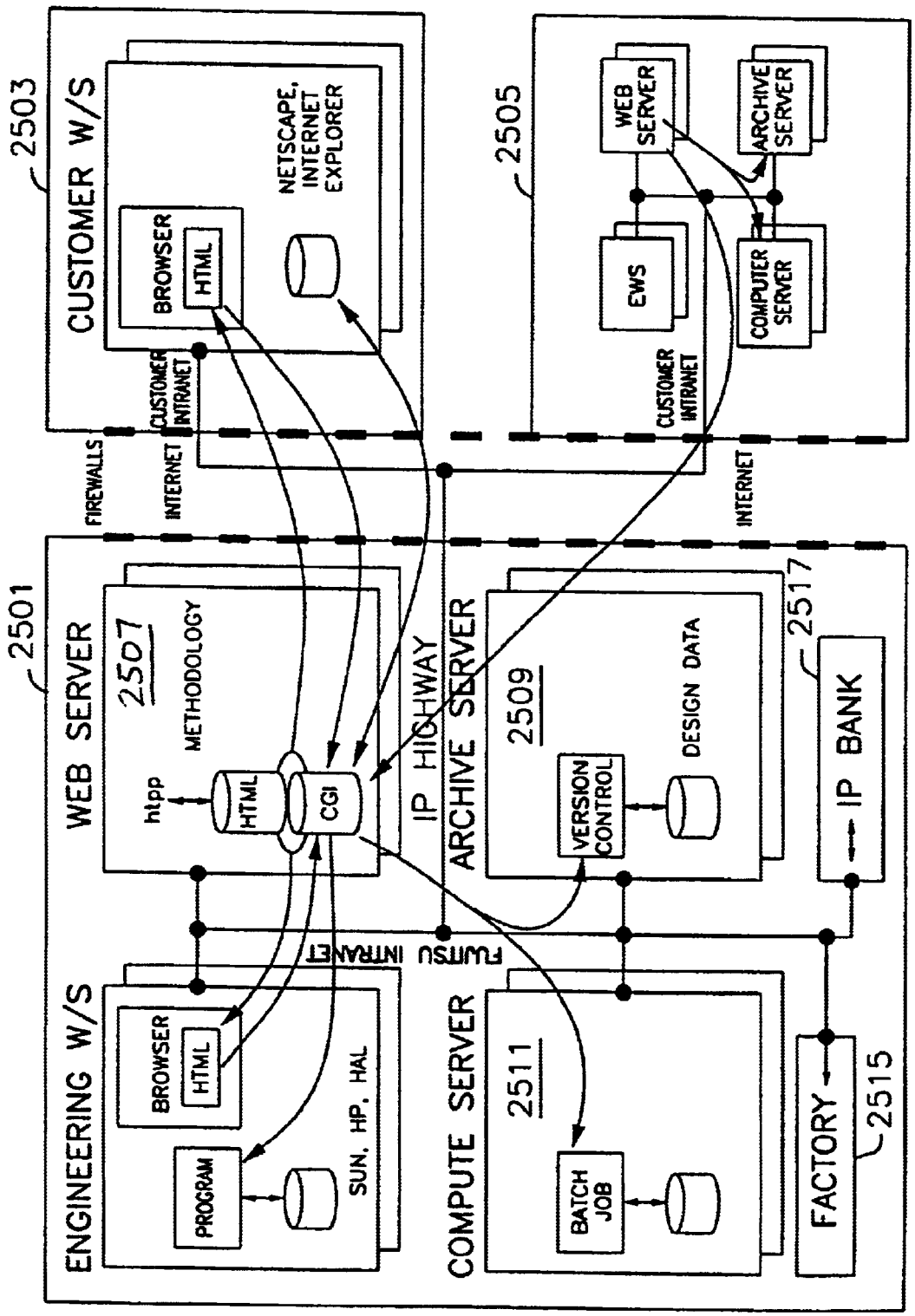
FIG. 2 is an illustration of an embodiment of a network architecture.

FIG. 2 is a block diagram of a design system in accordance with the present invention, and provides a convenient reference for an overview of aspects of the present invention. The design system includes an in-house system 2501 comprised of a plurality of computer devices connected by an Intranet. The in-house system is connected, through the Internet 2502, to customer systems 2503, 2505.

As illustrated, the in-house system includes web servers 2507, engineering workstations 2509, compute servers 2511, and archive servers 2513. A work station as defined here comprises workstations as typically known to those skilled in the art, PCs, notebook computers and any other form of computing device capable of being networked. The in-house system additionally includes a factory 2515 and an IP bank 2517. The factory comprises locations where integrated circuits are fabricated (for example, a foundry where wafers are produced), manufacturing and assembly facilities for packaged integrated circuits and final circuit assemblies. Linking the elements of the in-house system, through network ports on each of the system elements, is an Intranet 2519. In actual practice, the in-house system is likely to include many additional elements, such as non-engineering computer systems, mass storage devices, servers performing a variety of functions common to networked systems, printers, and the like. For clarity of description, however, these additional elements will not be discussed.

The engineering workstations are, in the described embodiment, SUN SPARC stations, although as those skilled in the art would recognize workstations from a variety of manufacturers may be used instead. In an embodiment workstations comprise PCs such as desk top, or laptop computers that are typically found in an office or home. The workstation includes hardware and software elements generally found in such workstations. In the described embodiment, some of the workstations include one of a number of design programs 2521 used in the design of integrated circuits. The design programs may be one of many widely available from a number of companies that specialize in creating tools for use in designing and testing integrated circuit designs. As will be understood after further discussion, the specific design program on a particular workstation is not critical.

The workstation also includes web browsers 2523. The web browsers provide a graphical interface for communicating via the in-house Intranet with other system elements. More specifically, the web browser is a hypertext markup language (HTML) compatible web browser, such as Netscape Navigator or Microsoft Explorer, which allows for the display of input forms for use by a user of the workstation. The input forms are provided by other system elements, specifically the web server 2507. As will be discussed, the input forms primarily relate to the capture of methodologies for use in designing integrated circuit blocks and chips, the attachment of methodologies to integrated circuit blocks and chips, and the execution of methodologies in the design of the integrated circuit blocks and chips.

A methodology is a series of steps chained together to make a pre-defined design flow that is used for designing and implementing a chip or block design. Each methodology covers a significant area of a design process for a chip and contains self documented step by step flows that, if desired, invoke tools and perform a main design tasks. The methodology is captured by a methodologies using an interface and flow control tool. In an embodiment the interface and flow control tool is a WBE environment (administration mode) and represents how a design flow should be run. By following the steps a designer is led through the design flow.

Examples of main methodologies are provided to clarify the concept. The pre layout methodology is where pre layout design considerations are quantized by a methodologist for use by one or more designers. Another Methodology is floor plan based optimization. In the floor plan based optimization a methodologist enters power planning and routing guidelines as a methodology for a designer to follow in designing and laying out blocks on a chip. The floor plan based optimization a methodology guides the designer in placing and routing power.

A sub-methodology is effectively the same as a methodology, consisting of a series of steps making a predefined flow. However, sub-methodologies cannot be run standalone. They require a calling methodology. Sub-methodologies are used wherever "something" is common to several 'main' methodologies. Making the "something" a sub methodology results in less duplication and easier maintenance. Examples of such a sub-methodology are Delay Calculation and Static Timing Analysis.

The web server, therefore, provides input forms, over the Intranet, to designers at workstations. The designers, in response to some of the input forms, provide information for use in executing a methodology. The same or other designers, in response to other of the input forms, select methodologies for use, and the order of use when appropriate, in designing an integrated circuit block. The same or still other designers, in response to still other of the input forms, work on steps of the methodologies, including executing design tools or programs such as the design program resident on the engineering workstation.

Accordingly, the web server communicates HTML forms with the engineering workstation in accordance with the hypertext transfer protocol (HTTP), and receives information from the engineering workstations. The web server utilizes a Common Gateway Interface (CGI) to receive data from the engineering workstations and to thereafter appropriately process the received data. The CGI is a standard for interfacing external applications with information servers, such as web servers. A CGI program, which is also called a CGI script, is generally written in programming languages such as C++ or Perl.

Some of the data provided by the designers is, in the described embodiment, stored and processed by a Unix process on the web server. For other data, such as a request to execute a design program or tool, the web server provides appropriate information to the workstations or the compute servers 2511, which include design programs for execution, so that the workstation or compute server will execute the design tool, in a proper configuration and with appropriate data. In addition, the web server transfers important data to an archive server to increase system reliability. The archive server is used to store files for back up. These files are generally not immediately needed, and in an embodiment the archived files are compressed as previously decided by a methodologist.

Upon completion of the design of the integrated circuit or block, design details are provided by the web server to the factory for fabrication of the integrated circuit, or to an IP bank to allow other designers use of the designed block. In addition, the web server is linked via the Internet to customers 2503, 2505. The customers may therefore be at almost any geographic location, allowing designers to be located at great distances.

Thus, the system of FIG. 2 provides for orderly design and test of integrated circuits groups of designers, who may be diversely located, coordinated using the web server. In order to more fully comprehend aspects of the systems and methods of the present invention, portions of the system of FIG. 2 and alternative embodiments thereof are discussed in greater detail below.

II. System Description

Figure 3:
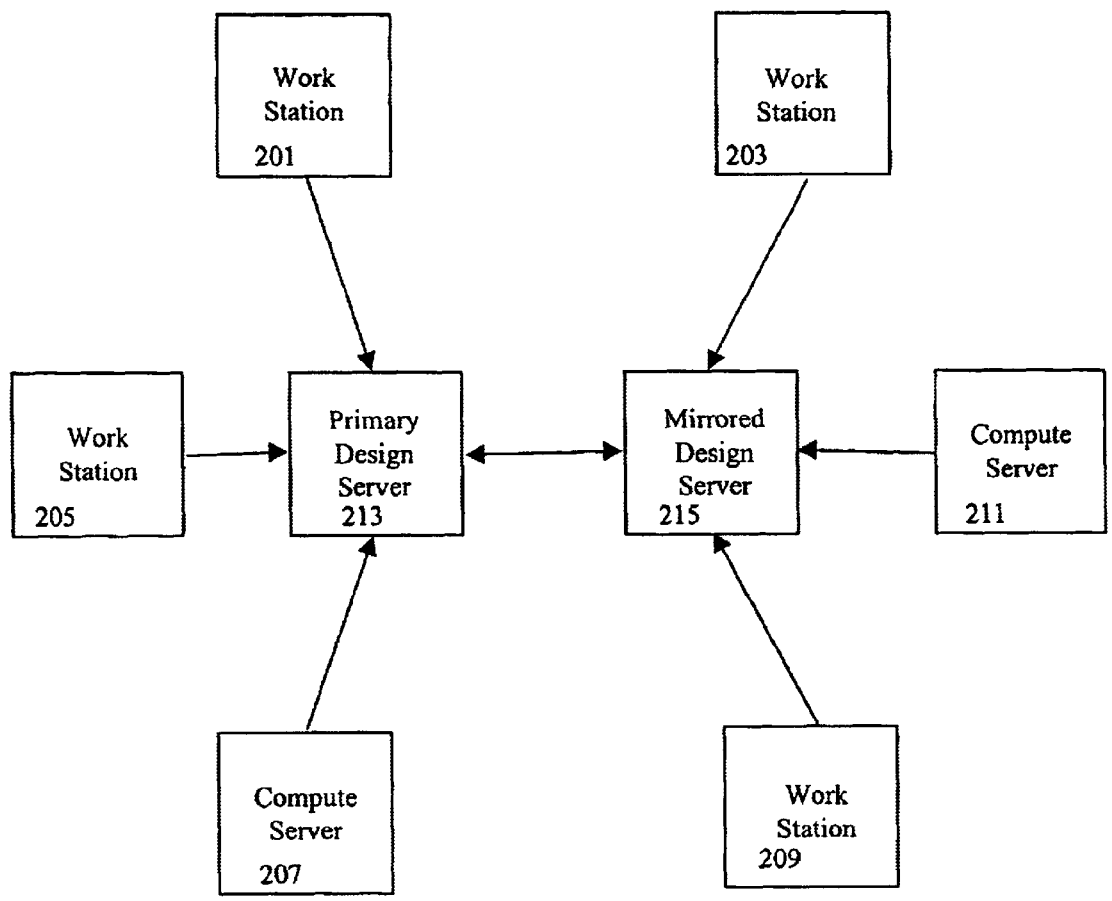
FIG. 3 is a block diagram showing the interconnection of remotely located work stations, design facilities and the hardware interconnections.

FIG. 3 is a block diagram showing the interconnection of remotely located workstations 201, 203, 205, 209 and compute servers 207, 211 connected to a primary design server 213 or a mirrored design server 215. The primary design server and the mirrored design server are also sometimes termed as web servers or methodology servers. The work stations, the compute servers and the design servers are used to design and test integrated circuits. The primary design server contains information pertaining to methodologies and blocks under design. The compute servers contain executable tools used in the creation and test of those designs. It should be noted, however, that in alternative embodiments the executable tools reside on the workstations, and in one embodiment the primary design server additionally functions as a compute server. In addition, in one embodiment each tool resides on separate compute server. The work stations, which through the use of the Internet or Intranets may be located at remote geographical locations from the primary design server, are used by design engineers to design the blocks. The design and test engineers utilize the work stations to access data and information regarding the blocks, to provide data and information for execution by the tools, and to otherwise communicate with the primary design server regarding the design of the blocks.

The primary design server and the mirror design server are interconnected and share data so as to allow increased throughput and access to design data and processes. In one embodiment the mirror design server is a classic mirror server, that is the mirror design server mirrors the information and data of the primary design server. In the one embodiment the primary design server and the mirror design server are substantially as easily accessible to any workstation, with access to the design servers substantially invisible to users at the workstations. In the described embodiment, however, the mirror design server is a geographically remote server from the primary design server. Mirroring is accomplished by having the primary design server and the mirror design server periodically, e.g., at predefined hours, interrogate the other server to determine if data on the other server has been updated. In one embodiment this is done for all data resident on the other server. In alternative embodiments, data updates only occur if data has changed with respect to specific blocks. Thus, if, as in the described embodiment, information pertaining to a specific block is located in specific directories on a design server, then only changes in those directories are provided to the interrogating server. This allows a convenient mechanism for sharing of data for blocks designed by design teams remote from one another, as well as for periodically updating block information designed at remote locations to a location responsible for overall chip design.

Figure 4:
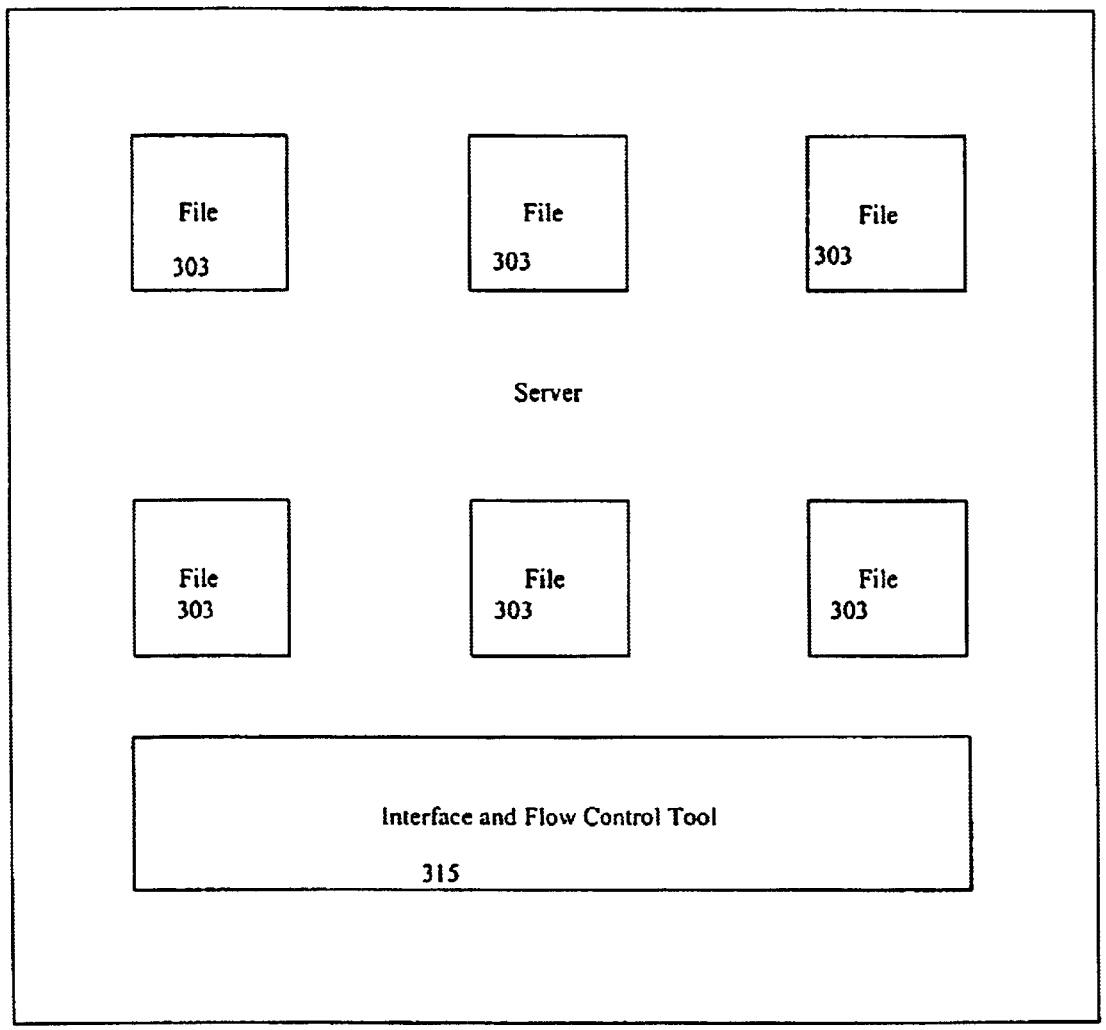
FIG. 4 is a diagram of the primary design server.

FIG. 4 is a block diagram of one embodiment of a design, i.e. web or methodology, server. In the described embodiment, the design server is a UNIX machine running an Apache web server. The design server includes an interface and flow control tool. In one embodiment of the invention, the interface and control tool is used to define methodologies for designing integrated circuits, attach a set of methodologies to a specific chip or block, and provide for the execution of the attached methodologies to achieve implementation of the chip or block. In other words, the interface and control tool provides an executable design environment for the design of integrated circuits.

The interface and flow control tool encompasses HTML pages and CGI scripts. The HTML pages include input forms for defining methodologies, including steps of methodologies, as well as chip and block home pages and executable methodologies. The CGI scripts receive and act on data input to the input forms to create files defining methodologies, chips and blocks, and executable methodologies attached to chips and blocks. The CGI scripts also cause execution of electronic design automation (EDA) tools residing on the compute servers (illustrated in FIG. 2).

Accordingly, the design server contains files 303. The files are created by the CGI scripts in response to input to the input forms applying new methodologies, and responsive to input to input forms attaching methodologies to chips or blocks. In addition, in one embodiment the files include files and libraries comprising design data formed as the result of the execution of the EDA tools. Storing the files and libraries in one location allows for a systematic approach to access and maintainability of design related information. In addition, in one embodiment the files are stored in varying directories. Storing the files and libraries in varying directories allows, for example, for specific chips or blocks to utilize subsets of commonly used files by first looking in specific directories for files prior to looking in a common directory.

Figure 5:
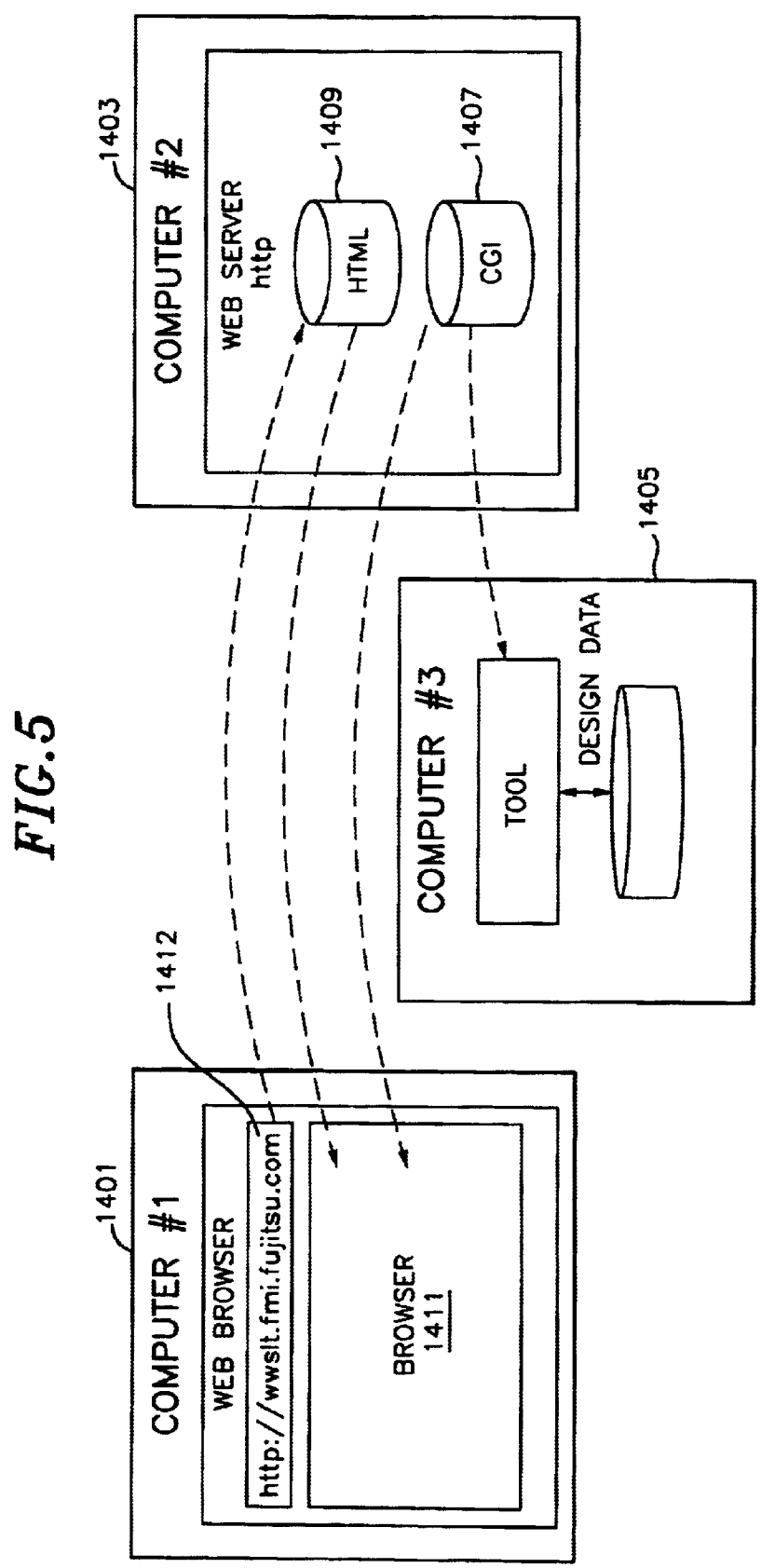
FIG. 5 illustrates communication between the workstation, web server, and compute server of FIG. 2.

FIG. 5 illustrates communication between a workstation 1401, a web server 1403, and a compute server 1405. In FIG. 5, the workstation 1401 is identified as computer no. 1, and includes a web browser 1401. The web browser includes a location identifier area 1409 and a display area 1411. An exemplary location identifier area is a web server with resident html code. In an alternative embodiment the location area identifier is a web server with resident XML code. The workstation transmits information in HTTP format to the computer identified in the location area. In FIG. 5, the location area of the workstation contains the URL of the web server, which is identified as computer no. 1.

More specifically, the contents of location area of the workstation points to an HTML file located on the web server. In response to the request from the workstation, the web server provides the HTML file to the workstation, which thereafter displays a web page based on the HTML in the display area. In the example of FIG. 5, the display page includes an input form. The input form includes an input section which provides an option for the execution of a design tool. Selection of the option results in transmission of a message from the workstation to the web server requesting execution of a CGI script or program.

The CGI script executing on the web server forms a request for execution of a design tool on a compute server, identified as computer no. 3 in FIG. 5. Preferably, the design tools executes in that batch environment, thereby allowing the CGI program to complete and return status to the workstation. The web server receives the result of the design tool and transmits the results to the workstation through the HTML interface. Thus, the designer at the work station is able to perform his design task using the web browser and does not have to leave the web browser to utilize a design tool.

Figure 6:
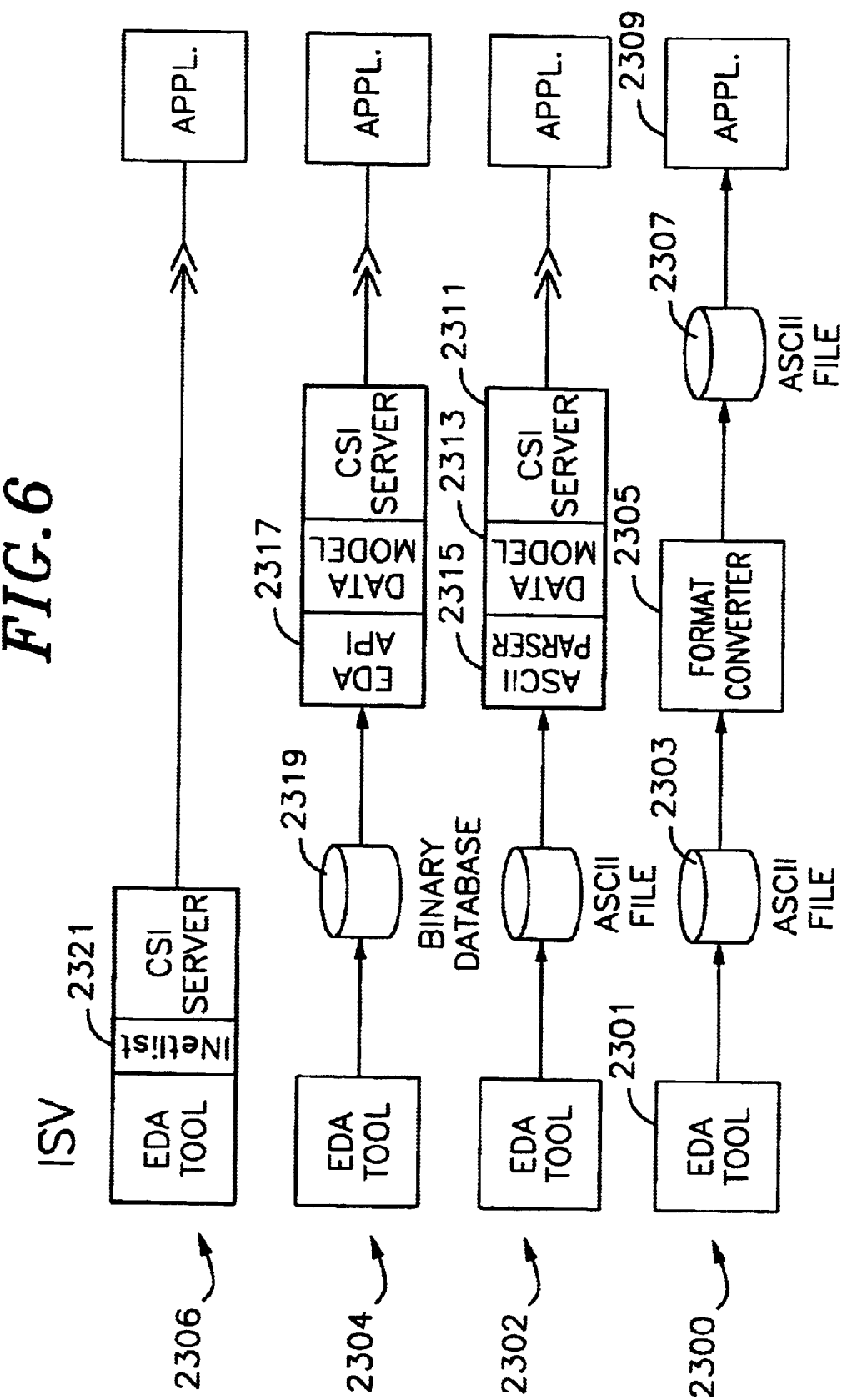
FIG. 6 illustrates four embodiments of communication between an EDA tool and an application, including embodiments having a common software interface, in accordance with the present invention.

In an alternative embodiment, the design tool is executed in real time, with the execution of the design tool being displayed to a designer at the workstation using an X window. FIG. 6 illustrates four communication methods used by alternative embodiments of the present invention. Each of the four embodiments include an electronic design automation (EDA) tool 2301 in communication with an application 2309. The application may be, for example, another EDA tool. The EDA tool may, for example, be a Verilog reader which reads a Verilog file and provides the information contained in the Verilog file to an application. The application may, for example, utilize the information from the Verilog file to compile the design into representative hardware elements.

In a first embodiment 2300, the EDA tool provides an output file 2303. The output file is in a format defined by the EDA tool. The application, however, is likely to require an input file of a different format. Accordingly, a format converter 2305 is used to convert the output file to a format acceptable to the application. In a second embodiment 2302, the EDA tool once again creates an output file. The output file, however, is provided to a parser. The parser extracts data from the output file and provides the data to a data model 2317. The data model places the data in a data structure. The CSI functions in the CSI server interface access the data structure to provide the correct behavior indicated by the CSI specification.

The application obtains data through a request to the CSI server. More specifically, the CSI server supports defined interfaces. The CSI server and the interfaces are identified by unique identifiers. A client wishing to use an interface implemented by the CSI server issues a request for the server and the interface. If the CSI server supports the defined interfaces, then the CSI server provides a common virtual function table to the application. The virtual function table points to virtual functions, and the virtual functions may be called by indexing into the virtual function table. The application thereafter uses the virtual function table to obtain data from the CSI server using the interfaces supported by the virtual function table. In addition, the first entry of the virtual function table is for a function allowing the client to request additional interfaces from the CSI server.

In aspects of the present invention, data provided to or received from EDA tools and the like pertain to integrated circuit designs. Thus, interfaces for requesting data pertaining to integrated circuit designs are supported by the CSI server. In one embodiment of the present invention, the data includes net data, module data, and pin data. Net data is data pertaining to the interconnection of gates, cells, modules, blocks or other identifiable sets of gates. Thus, examples of net data include a bit or a bus, or any interconnection between functional units. Modules have nets and pins and instances. Pins are simply points to which nets, or wires, are attached.

Accordingly, the CSI server supports net interfaces, module interfaces, and pin interfaces. In addition, the CSI server supports additional interfaces pertaining to generally communicating with the CSI server.

The net, module, and pin interfaces contain functions which allow access to enumerators of their sub-objects; i.e. interfaces with a consistent set of methods that allow a client to access sequentially members of a list. The enumerator types include interfaces for obtaining a list of names, a list of modules, a list of nets, a list of component instances, a list of pins, and a list of properties. The methods return, for example, a module to which a net belongs, a list of pin to which a net is attached, the type code of a pin, and other similar information.

FIG. 6 illustrates a third embodiment 2304. In the third embodiment an API 2317 specific to the EDA tool is used to extract data from the EDA tool database 2319. The API for the EDA tool is, however, proprietary to the EDA tool, and does not necessarily provide data in a format suitable for the application. Accordingly, the third alternative embodiment includes a data model object to obtain appropriate data from the API, and to create data structures appropriate for use by the CSI server.

FIG. 6 also illustrates a fourth embodiment 2306. In the fourth embodiment, both the EDA tool supports the common software interface. Accordingly, the CSI server acts as a reader to obtain data from the EDA tool, and acts as a writer to provide data to the application.

Figure 7:
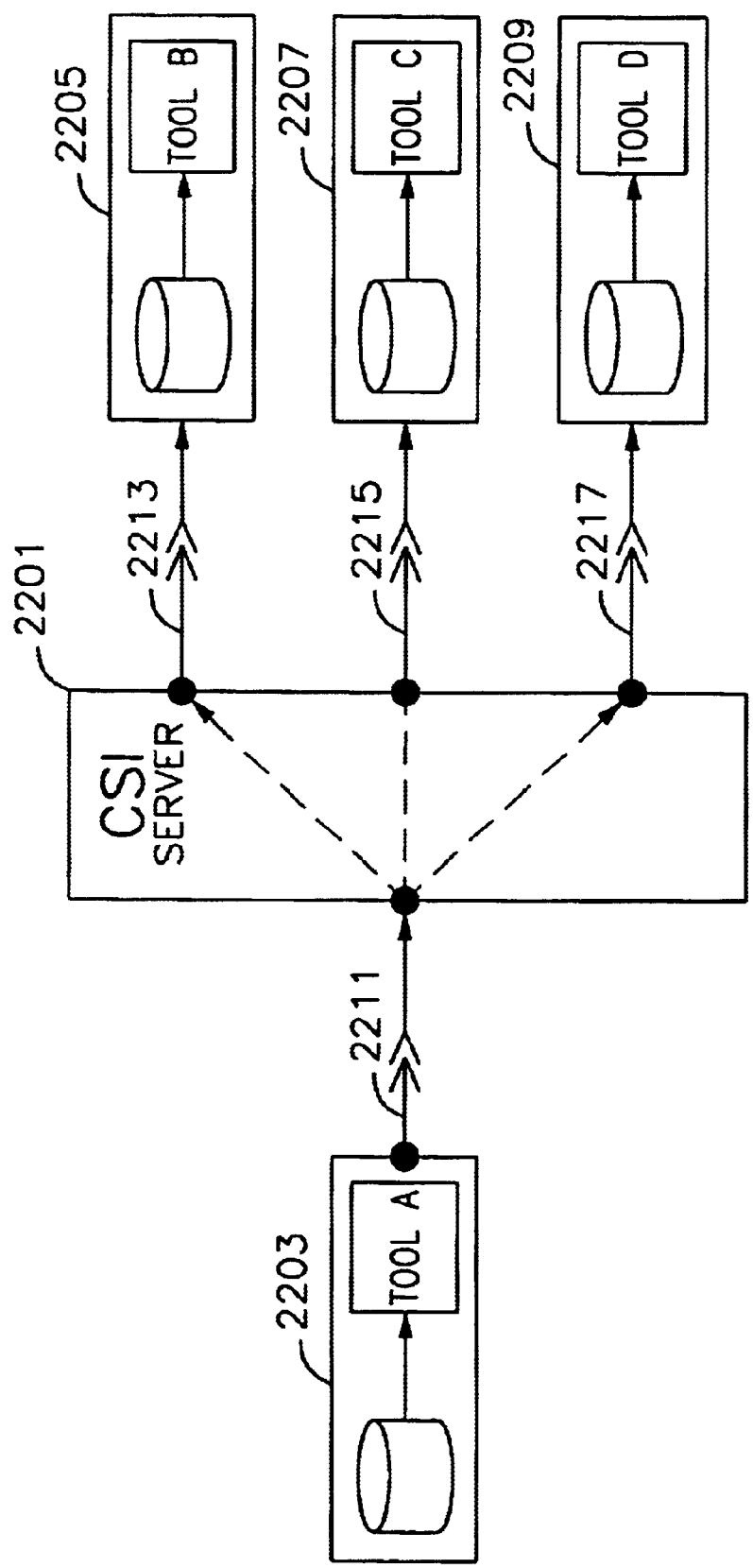
FIG. 7 further illustrates inter-tool communication using a common software interface server.

FIG. 7 illustrates an example of a tool communicating with a plurality of other tools using a common software interface server. As illustrated in FIG. 7, a tool A 2203 provides output which is utilized by a tool B 2205, a tool C 2207, and a tool D 2209. The output of tool A is provided to a common software interface client 2201, which includes both client and server. The common software interface server interfaces with each of the tools B, C, and D.

Figure 29:
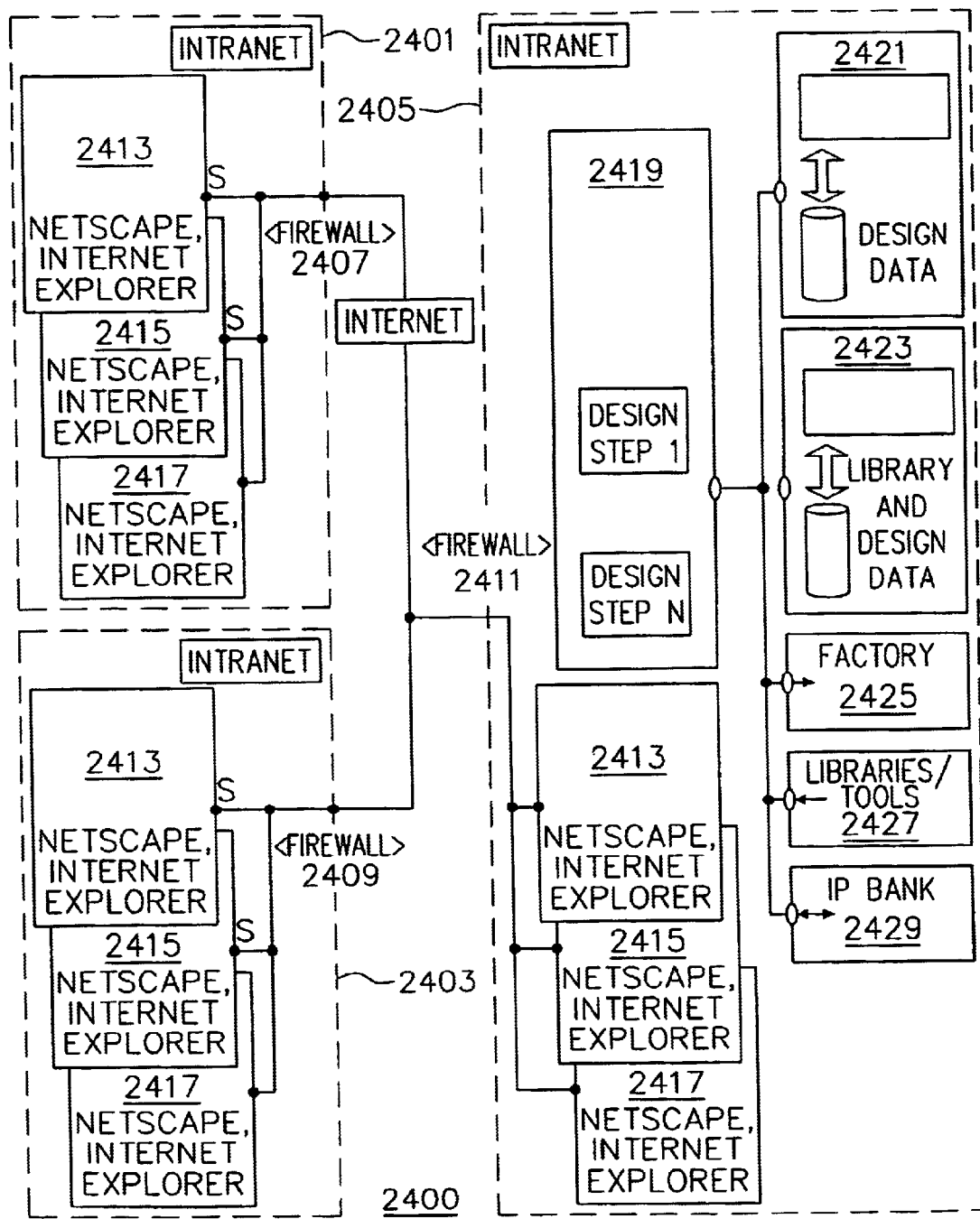
FIG. 29 is an illustration of a embodiment of a network architecture in accordance with aspects of the present invention.

FIG. 29 illustrates a network design system in accordance with aspects of the present invention. The network design system includes a first network 2405, and a first remote network 2401 and a second remote network 2403. The remote networks each include a plurality of workstations 2413, 2415, 2417 interlinked by an intranet. Each of the workstations include a web browser, such as are available from Netscape or Microsoft. The remote networks are connected to the Internet through fire walls.

The network system is also connected to the Internet by way of a fire wall. The design network includes a design server 2419. Connected to the design server by way of an intranet are a plurality of workstations 2413, 2415, 2417 such as those in the remote networks. Also connected to the design server by way of an intranet is an archive server 2421 and a compute server 2423. The archive server stores design data pertinent to the design of integrated circuits coordinated by the design server. The compute server includes both library and design data used by EDA tools. As illustrated only a single compute server is provided. In practice, a plurality of compute servers are provided, with each compute server executing a single EDA tool. Further connected to the intranet are an IP bank 2429 which stores block information so as to allow for reuse of IP blocks. Libraries and tools are also stored on a library/tool server 2427. A factory 2425 is also connected to the intranet, with a factory being responsible for the generation of the physical integrated circuits.

As illustrated, the design server includes design step 1 through design step n. This illustrates that the design server contains information for the steps of designing the integrated circuit.

III. Process Description

A. Top Level Flow

Figure 8:
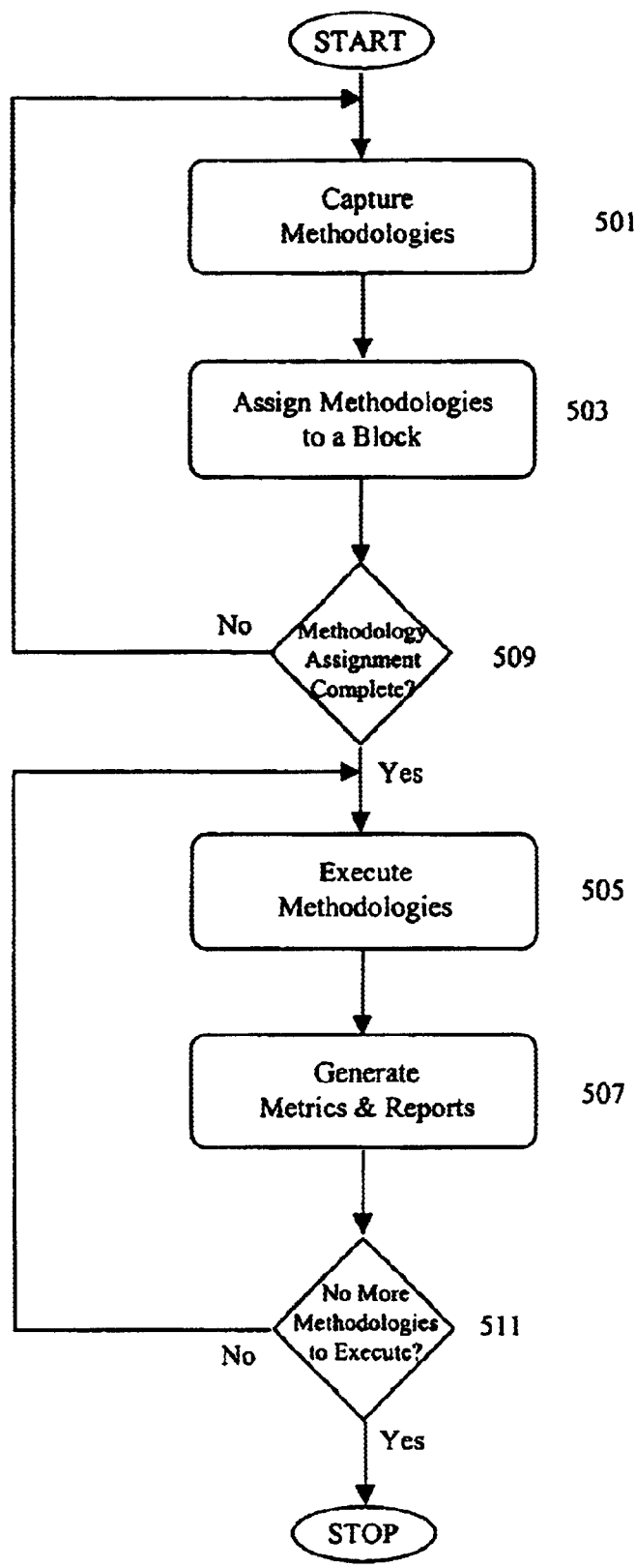
FIG. 8 illustrates a flow chart of a process of an embodiment of the invention.

FIG. 8 illustrates a flow diagram of a process of an embodiment of the invention. The flow diagram of FIG. 8 may be viewed as having three primary components. In a first component methodologies are captured 501 so that the methodologies are quantized and recorded as an executable set of steps. A second component comprises the attachment of various methodologies to a specific block or chip 503. A third component consists of the execution of the attached methodologies to implement the design and test of the block or chip 505.

In step 501 of the process methodologies are captured. Capturing methodologies is accomplished by presenting input pages to experienced methodologists, preferably those with expertise in the field. Input pages generally are Hyper Text Markup Language (HTML) based forms that are viewable using a standard web browser. The capture of methodologies can be implemented at any time. In an embodiment the capture of the methodologies is accomplished in a unique and orderly way.

The methodologists, using the input pages, define a methodology. The definition of the methodology includes the tool, or tools, used in the methodology, the files required for use of the tool, and executable steps for preparing an environment for the tool and the execution of the tool. In addition, the definition of the methodology includes steps which reflect the output of tools, such as data files, or files required for tool execution. The definition of the methodology further includes help files to assist in executing the methodology, and descriptions of the expected results of executing the methodology. In one embodiment the help files are executable PERL scripts. PERL is a programming language that is used to generate executable scripts.

In one embodiment a methodology comprises a directed acyclic graph that defines order in which steps of the methodology are executed. A step is one of a file, a job, information, a sub-methodology, a logical OR, or a logical XOR. A file step requires generation of a file, or files, at a specified location. A job step indicates execution of a tool, and may include an executable configuration script, which is created at the time of execution. The executable configuration script may be a shell script. A shell script includes commands that are interpreted/executed by a shell, which is a command line interpreter. Thus, the shell takes commands programmed in shell scripts and executes them.

A sub-methodology step indicates the step is a separate methodology. An information step provides information to a designer. A logical OR step and a logical XOR step are branch steps that provide branching capability within a methodology.

In step 503 of the process, methodologies are assigned, or attached, to a block. In one embodiment the methodologies define a process flow from the initial generation of HDL to tape out of the fabrication guidelines, or even fabrication of the chip itself. The methodologies are defined so as to include executables. Thus, the attachment of methodologies to the block define an executable process flow for the design and test of the block.

In step 509 the process determines if attachment of methodologies to the block is complete. Once complete, the process continues to step 505 in which methodologies are executed. In one embodiment of the invention, a complete set of methodologies need not be attached to the block prior to execution of methodologies. Instead, further methodologies may be added while existing attached methodologies are added. For example, a front-end methodology may be executed prior to capturing or attaching a layout methodology. Thus methodologies may be assigned at any time during the design process to allow individual blocks to be redefined as required.

In step 505 of the process the methodologies are executed so as to design the block. A given set of designers require access to the design at differing times of the design cycle, some of which are overlapping. A given designer, in addition to requiring access only at certain time, also only requires access to the tools and methodologies that are deemed necessary to carry out the task. Each person in the preselected design team, using the selected tools at the scheduled time, executes the methodologies by performing their portion of the work on the circuit. Executing the methodologies in this manner assures that design teams that are located in isolation from each other perform their tasks at the appropriate stages without having to be in close contact with all the designers in their various locations. In addition, as the methodologies are designed to include executable setup files and to include help files, the presence and assistance of highly skilled expert methodologists is not necessarily required to further facilitate design and test of the block.

In step 507 of the process metrics and reports concerning the execution of the methodologies are generated. The metrics and reports pertain to the status of the design and test of the block, the results of execution of various steps which make up a methodology, problem reports, tool usage reports, and reports pertaining to any aspect of the execution of the methodologies. In particular metrics refer to any measurement tool that provides quantifiable indication of a processes quality, progress or completion. Accordingly, during execution of the methodologies the process tracks and records all actions and results of actions.

Once the metrics and reports are generated, the process determines in step 511 if more methodologies remain to be executed. If more methodologies remain, the process of executing methodologies and generating metrics is continues. If no more methodologies remain to be executed the process completes.

Figure 9:
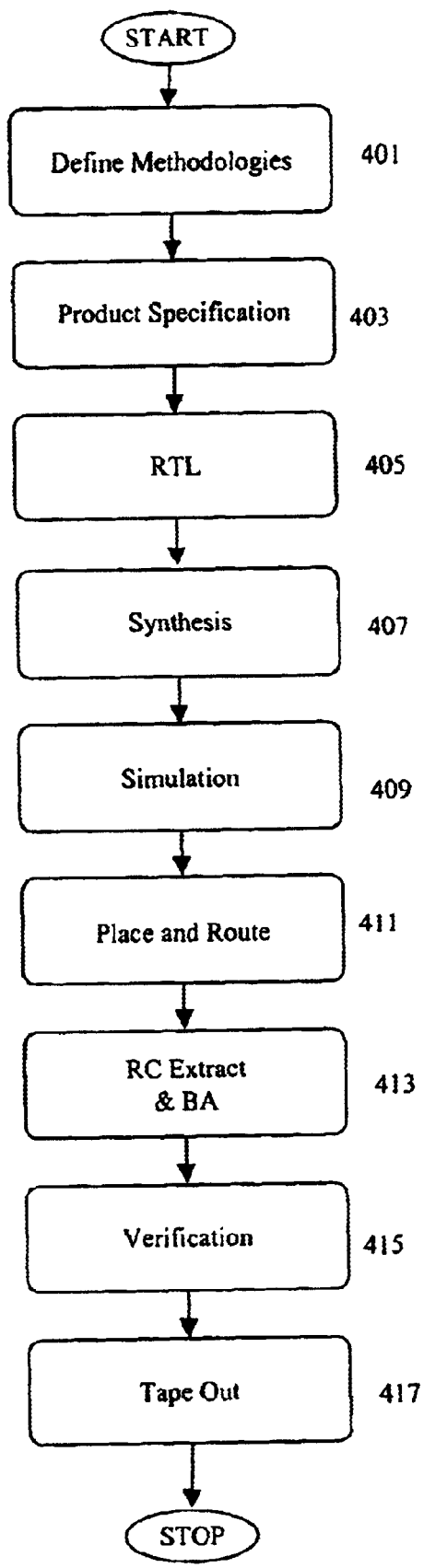
FIG. 9 is a flow chart of a process of designing an integrated circuit according to one aspect of the present invention.

FIG. 9 is a flow diagram of a process incorporating aspects of the process of FIG. 8 for designing an integrated circuit. The process of FIG. 9 is meant to illustrate a specific example of a design process in accordance with FIG. 8. As should be clear from the process of FIG. 8, the actual steps performed, and the order of their performance, are determined when methodologies are attached to a specific block.

In the process of FIG. 9, first a product specification 403 is created. In this stage of the design a design team decides what the chip do in terms of its desired behavior and partitions the chip into a series of function blocks required.

At step 403 the design team also evaluates what IP functions exist, and what IP functions will be required to be designed. The product specification may be, for example, in the form of HDL, VHDL, Verilog, or in other forms.

In step 401 of the process methodologies are selected for use in the design of the circuit or block. In selecting methodologies, the designer determines which tools and processes are to be used in designing and testing the block or circuit. The tools and processes selected drive the steps of the design process.

After the specification phase, a series of steps 405,407, 409, 411, 413, 415 are carried out that result in a physical design of the circuit. Each step in the design process may require one or more iterations until that stage of the design has been satisfactorily completed. Also, after two or more steps are completed, it may be realized that the cumulative solution obtained at the stage is inadequate and must be reiterated. Tracking of the design process is therefore sometimes difficult. The problems of tracking progress of the design process is compounded when design teams implementing each task are located in remote locations, making communications difficult.

Step 405 of the process is the generation of a register transfer level (RTL) model. Generation of the RTL model is required if no preexisting block exists, such as when a block must be designed from scratch. The RTL model represents the block behavior of the design. The RTL model is a synthesizable behavioral model that is translated into a structural model providing a logic level description of the system. The generation of the RTL model is accomplished using methodologies previously selected.

Step 407 of the process is the synthesis of the circuitry necessary to implement the logic functions of the RTL model. The designer synthesizes the circuit using a methodology including a synthesis tool. The methodology corresponds to one or some of the methodologies previously selected. An analysis program optionally may be executed as part of this step, with the analysis program used to verify that the output of the synthesis step behaves in accordance with the product specification. The use of the analysis program is generally specified as a separate methodology, although it may be a sub-methodology or step of the synthesis methodology.

Step 409 of the process is simulation of the overall design. All of the components of the design are assembled and a simulation is run. The simulation tool, test vector generation, and other matters are determined by the selected methodologies. The design is adjusted until satisfactory simulation results are obtained. At this point in the design cycle, a satisfactory design consists of a schematic that contains components such as transistors that may be built on the integrated circuit, and that when simulated using appropriate models give appropriate results. This model generally does not take into consideration the physical layout of these components on the integrated circuit substrate.

Step 411 of the process is placing the components of the design on the substrate and routing of signal to and from the components. Place and route is generally accomplished using one or more place and route tools. The place and route tools used are specified by the selected methodologies. The output of the place and route is a representation physical layout of the integrated circuit as it is built.

Step 413 of the process is RC extract and Back Annotation.

Step 415 of the process is verification of the design. Verification consists of ensuring that the result of design conforms with the product specification. Verification is accomplished using one or more tools employing one or more techniques. The tools employed, and the techniques used, are specified by the selected methodologies. The verification step includes timing verification, mask verification, and often formal verification. Extraction of data to put back into a subsequent simulation is performed in this step.

Step 409 is a simulation performed using data extracted from the previous step to perform a final check to ensure that the final design conforms with the product specification.

After verification of the circuit, step 417 of the process is tape out. At tape out the design is finalized for a prototype to be produced. To produce the prototype integrated circuit, information is generated to produce the semiconductor mask. The masks are sent out and an integrated circuit foundry fabricates the circuit.

Thus, in the process of FIG. 9, the design process flow begins with the selection of methodologies, and proceeds, using the selected methodologies, until fabrication of the integrated circuit is complete. Of course, those skilled in the art will recognize that, after selection of the methodologies and the specification of desired circuit behavior, many different design flows may be used. For example, simulation and verification may, and often do, occur at each stage of the design process. Similarly, modification of the circuit design to allow for testing using scan chains, BISTs, and the like is also often generally accomplished.

B. Methodology Capture

Design methodologies, i.e., methodologies, for web based integrated circuit design and fabrication are captured using HTML (Hyper Text Markup Language) based forms that are viewable over the world wide web using http protocol. HTML based forms, i.e., input pages, are provided to methodologists to be used during capture of methodologies. The methodologists complete the HTML based forms and submit them to the web, i.e. design or methodology, server to capture design methodologies.

When the methodologist inputted data is submitted to the web server, a number of files, which comprise the captured methodology, are generated. Each design methodology defines an executable set of steps, and the generated files define the steps. Each design methodology will eventually be associated with various specific blocks and/or chips by listing it in block and/or chip home pages as one of the design methodologies to use. The home pages also serve to order the execution of the design methodologies that are listed in them, respectively. Each design methodology may be associated with more than one block and/or chip.

The files associated with design methodologies include info files and index files that are used to maintain design methodology data. In other words, the info files and the index files contain information regarding steps of the associated design methodology such as name, description, type and order of execution. The files that comprise each design methodology also include a set of files associated with each step in the design methodology. The files that are associated with design methodology steps also include info files and index files associated with them.

In an alternative embodiment, the design methodology data is stored in a database. The database may be in one of many various implementations. In one embodiment, the design methodology data is stored in an Oracle database.

The files associated with design methodologies preferably include an executable documentation file. The executable documentation file, created by the methodologist of the associated design methodology, contains information regarding the purpose of the design methodology, information pertaining to a specific step, and/or other information the methodologist believes relevant. The design methodology also preferably includes one or more executable documentation files that are associated with a corresponding step of the design methodology. The executable documentation files associated with the design methodology and the steps are further processed by an integrated circuit design and fabrication system to customize associated methodology step pages when they are applied to a block.

The executable documentation file preferably contains codes in a programming language such as Perl. When a design methodology step page is displayed for a particular block, a programmable part of the documentation displays specific information pertaining to the particular block. This technique allows the design methodology step page to correctly provide specific details which may be important for certain implementations. For example, the name of the block may be displayed directly in the documentation. The executable documentation files and other files generated during design methodology capture are executed to implement the design and test of the associated blocks or chips.

Figure 10:
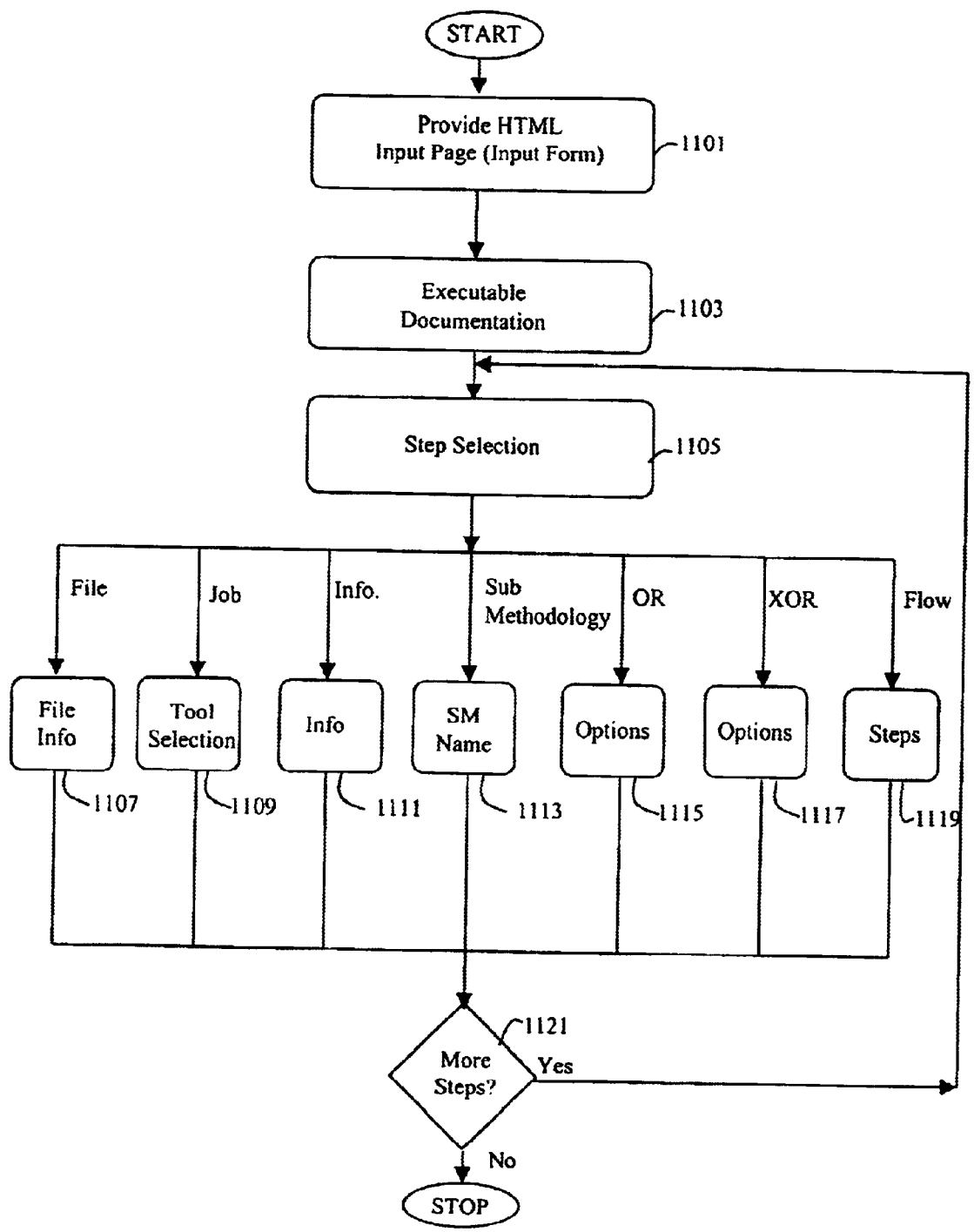
FIG. 10 illustrates a flow chart of a process for capturing methodologies.

FIG. 10 illustrates a flow diagram of a process for capturing design methodologies. In step 1101 the process provides an input page in HTML format. The input page at step 1101 allows a methodologist, typically an experienced integrated circuit designer, to enter details of a design methodology. The input page, after relevant data is filled in, is subsequently submitted to a web server for generation of files that comprise the design methodology.

In step 1103 the methodologist prepares an executable documentation file, i.e., an HTML file fragment, pertaining to the design methodology. The documentation entered in step 1103 is meant to pertain to the design methodology as a whole. The methodologist may also provide an executable documentation file associated with each of the steps in the design methodology. In one embodiment, comments entered in the executable documentation file are a series of text entries. In another embodiment, comments are executable PERL scripts which provide instructions and other items of information to designers.

In addition, a step may be assigned dependencies in terms of required files or required succeeding steps. In one embodiment, the interface and flow control tool uses the dependencies to display statuses of preceding and succeeding steps during the integrated circuit design process. An advisory may also be provided to indicate that required preceding steps have not been completed. Further, steps of the design methodologies may be results of executing one or more prior steps. For example, a file comprising a netlist may be a step, where the netlist file was generated using a tool in a preceding step.

In step 1105 a step in the process of capturing the design methodology is selected. The process receives input from the methodologist who selects a type of step or operation to be executed in the design methodology being captured. In one embodiment, seven step types, i.e., operation types, are available for defining executable design methodologies: file, job, information, sub-methodology, logical OR, logical XOR, and flow.

In file step 1107 the process receives as input from the methodologist a file name and a location of the file. For a job step 1109 the process receives as input from the methodologist a tool name to be used during job execution.

Referring now to FIG. 11, a screen comprising names of available tools is shown. The designer is allowed to select an available tool. A pointer providing a path to the tool for execution of the tool is incorporated into a design methodology along with the selection of the tool. The pointer may point to a location on a design server, e.g., the primary design server. Alternatively, in the embodiment described, a pointer points to a tool executing on a compute server.

Returning now to FIG. 10, the process also receives in step 1109 information pertaining to the environment produced by the tool. The tool environment is executable which, for use, configures a computer system and a tool.

For an information step the process receives in step 1111 as input from the methodologist information which may be pertinent to the design process. For a sub-methodology step the process receives in step 1113 the name of a sub-methodology. Sub-methodologies are design methodologies called from other design methodologies, and are utilized to form a more complex overall design methodology.

In steps 1115 and 1117 the process receives branching options from the methodologist for OR and XOR branching respectively. A logical OR and a logical XOR step provide for parallel and branching paths, respectively, in a design methodology. For example, a design methodology may allow for any single one of several versions of a tool to be used in a job step. Preceding the job step, therefore, is an XOR step providing for selection of the version of the tool.

In step 1119, the process receives from the methodologist a list of steps to be executed within a flow step. The flow step is similar to a sub-methodology except that the flow step may exist only within a design methodology or a sub-methodology. In other words, the flow step may not stand alone. Thus, a flow step typically contains multiple steps and is used to organize the design methodology as to reduce the number of steps called directly by the design methodology.

After each of the steps 1107, 1109, 1111, 1113, 1115, 1117 and 1119 is selected, the methodologist selects a succeeding step to be executed subsequent to the selected step. By selecting the succeeding step, the methodologist is able to define an order in which the selected steps are executed. The order of step execution is incorporated into a directed graph, i.e., directed acyclic graph (DAG), which is one of the files created when the methodologist submits information in the input page. Thus, the directed graph contains information regarding order in which the selected steps are executed. Not all steps may be executed sequentially. In other words, some of the steps may be executed in parallel.

In step 1121 the process determines if the methodologist desires to enter more steps. If the methodologist desires to enter more steps, the process returns to step 1105, and otherwise the process terminates. In step 1105, the methodologist selects the next step and the process of step selection and incorporation of the selected steps into the directed graph repeats.

FIG. 12 is a list of design methodologies that may be attached to a block home page or a chip home page. As indicated by option to edit each design methodology in FIG. 12, design methodologies may be edited after their initial creation. This editing may be done to add additional materials, including steps or sub-methodologies or to modify the design methodology. In addition, sub-methodologies may be separately selected and modified as well.

Methodology capture allows for design methodologies to be defined having parallel paths. For example, a design methodology may be defined such that several versions of a tool may be used during the design process. Thus, designers of the design methodology, during the design process, may select any of the parallel tools to accomplish the design.

During the design process, it is also possible that use of a tool that replaces the tool specified in the methodology is required. For example, a new version of a tool may be required for use in a design. The selective tool override function allows a designer to specify the new version, overriding the choice defined in the design methodology by the methodologist. By providing the selective tool override function, both the old and new versions of the tool may be used with the same methodology.

During the methodology capture process, an executable chain job is also defined. A chain job comprises a series of job steps that the methodologist captures for execution in a specific order. Only batch job steps and not interactive job steps are generally in a chain job.

Although HTML based forms are typically used to capture design methodologies, it is often more desirable to use XML (Extensible Markup Language) script to define design methodologies because of advantages that XML has over HTML. In XML, information is divided into useful components called elements, e.g., titles, paragraphs and part numbers. The elements may be formatted, sorted, or searched in consistent fashion. The elements are typically named and defined in a computer program called a Document Type Definition (DTD)

Using XML, a methodologist is able to create a single file to describe each design methodology. The single file that describes the design methodology may be used to create other files needed to execute the design methodology. For example, new features can be added to XML over time since XML is an extensible language. In addition, parsers are easy to develop using XML. For example, the parsers may be partially generated automatically from the DTD. Further, XML sources may be scanned by various different programs for different purposes. For example, a source code based on XML may be scanned by a search engine.

Another benefit of using XML is that XML is capable of providing multiple language support. For another example, an XML file is easy to create provided that a good DTD has been created. In addition, an XML-based DTD file may be used to specify the internal nature of the XML files used to define design methodologies. Further, XML hyper-linking is more powerful than HTML hyper-linking, and XML hyper-linking may be used to refer to parts of other XML files.

Widely used web browsers may not have a capability to display pages having embedded XML. Therefore, in an alternate embodiment, rather than using an input page to capture design methodology, a methodologist creates an XML script defining a design methodology in a single file. In this embodiment, the XML files are used by Common Gateway Interfaces (CGI's) to drive the integrated circuit design and fabrication system rather than directly viewed using a browser.

Figure 13:
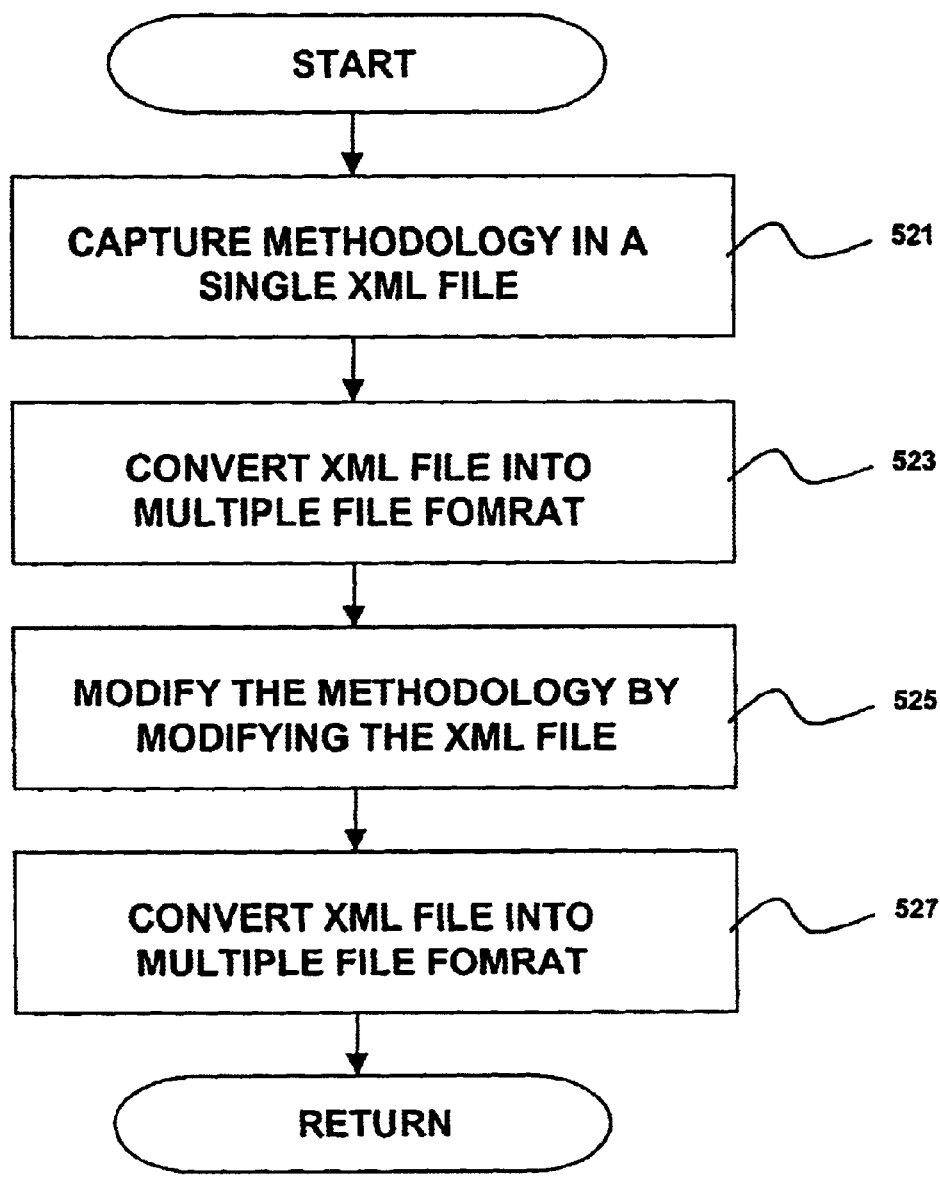
FIG. 13 is a flow chart of a process of using XML as a methodology capture script.

FIG. 13 is a process of using XML as a design methodology capture script. According to the process in step 521, a methodologist captures a design methodology in a single file in the form of an XML script. Next, a converter with XML parsing capability is used in step 523 to convert the captured design methodology into multiple files including info and index files as well as a directed acyclic graph (DAG) file.

As shown in step 525, the methodologist may update the design methodology by modifying the XML file. Thus modified, the XML file may be converted again into multiple files. Use of a single XML file is preferable to using multiple files generated by HTML forms since the single XML is easier to archive and maintain than the multiple files.

The process in step 527 may convert the modified design methodology in XML format to the design methodology format where the design methodology comprises multiple files. In an embodiment of the present invention, a converter converts the captured design methodology format having multiple files to a single file having an XML script. A specification of a Methodology Document Type Definition (DTD) is used during development of these converters.

Many of the files used during file steps and job steps while executing design methodologies are extremely huge. Generally, these files are stored in the integrated circuit design and fabrication system for days or weeks during the chip design and fabrication process.

System resources may be conserved by compressing some of the files and decompressing the files when needed. In an embodiment of the present invention, the methodologist of the design methodology is able to select file steps that are candidates, i.e., compressible file steps, for applying automatic compression and decompression during methodology capture. The methodologist may specify one or more of the file steps as compressible in the design methodology.

Since it may take an extensive amount of time to compress or decompress a file, a compute server rather than a web server is generally used for compression and decompression. Thus, the web server is not burdened with these tasks and web pages are kept from timing out.

Thus, a methodologist is given control over selecting which steps are compressible. In one embodiment, once the methodologist selects the compressible file steps, the information contained in a directed acyclic graph (DAG) is used to automate the tedious chore of determining when files are to be compressed. Although the file compression and decompression are automated, the integrated circuit design and fabrication system is preferably also capable of handling a situation where a designer manually compresses or decompresses a file from a command line.

In the embodiment described above, therefore, none of the files associated with a particular file step may be compressed unless the particular file step is marked as compressible. Even if a file step is marked as compressible, some of the files associated with that file step may not be compressed. For example, there are some files that are generally excluded from compression. The files that are generally excluded from compression include: a) files that are already compressed; b) technology library files that should be left in their uncompressed form for speed; and c) files that are too small to benefit from compression.

Figure 14:
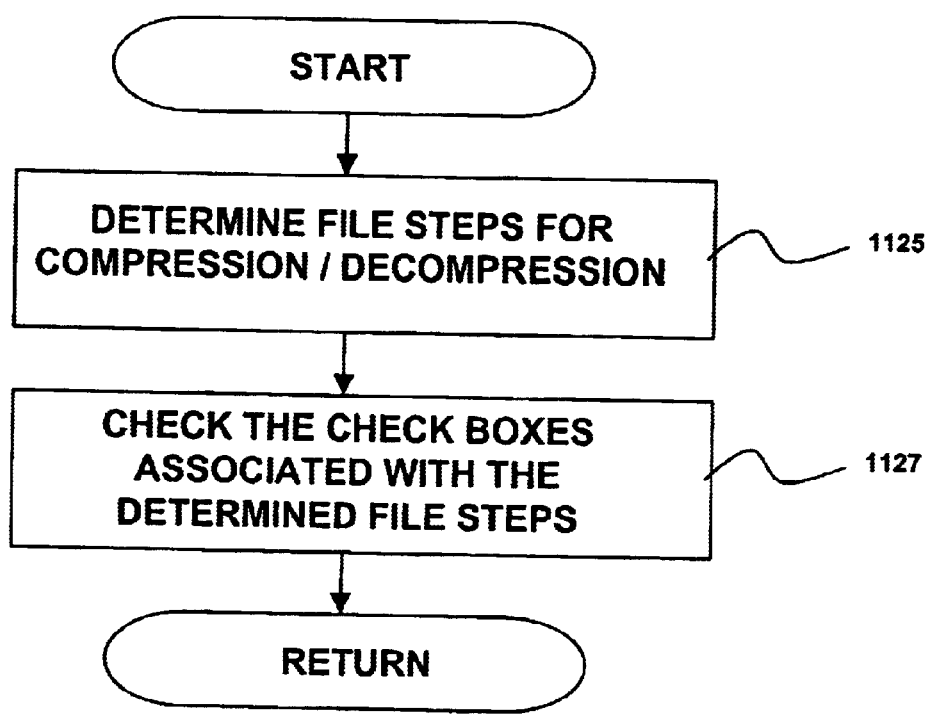
FIG. 14 is a flow chart of a process of selecting file steps that are to be associated with automatic compression and decompression.

FIG. 14 is a process of selecting file steps that are to be associated with automatic compression and decompression. In step 1125, a methodologist determines which file steps are candidates for automatic compression and decompression while capturing the design methodology. Check boxes are provided on a step parameters edit page that is accessed by the methodologist so that the methodologist may mark the selected file steps. In step 1127, the methodologist chooses to check one or more check boxes to specify that the files associated with the checked file steps are candidates for automatic compression and decompression. The checked file steps are called compressible file steps.

A methodologist may mark some of the file steps as both editable and compressible. Thus, a compressed file may need to be edited. To edit a file, an uncompressed native version of the file is generally required. Therefore, a compressed file is preferably decompressed first before being edited.

Figure 15:
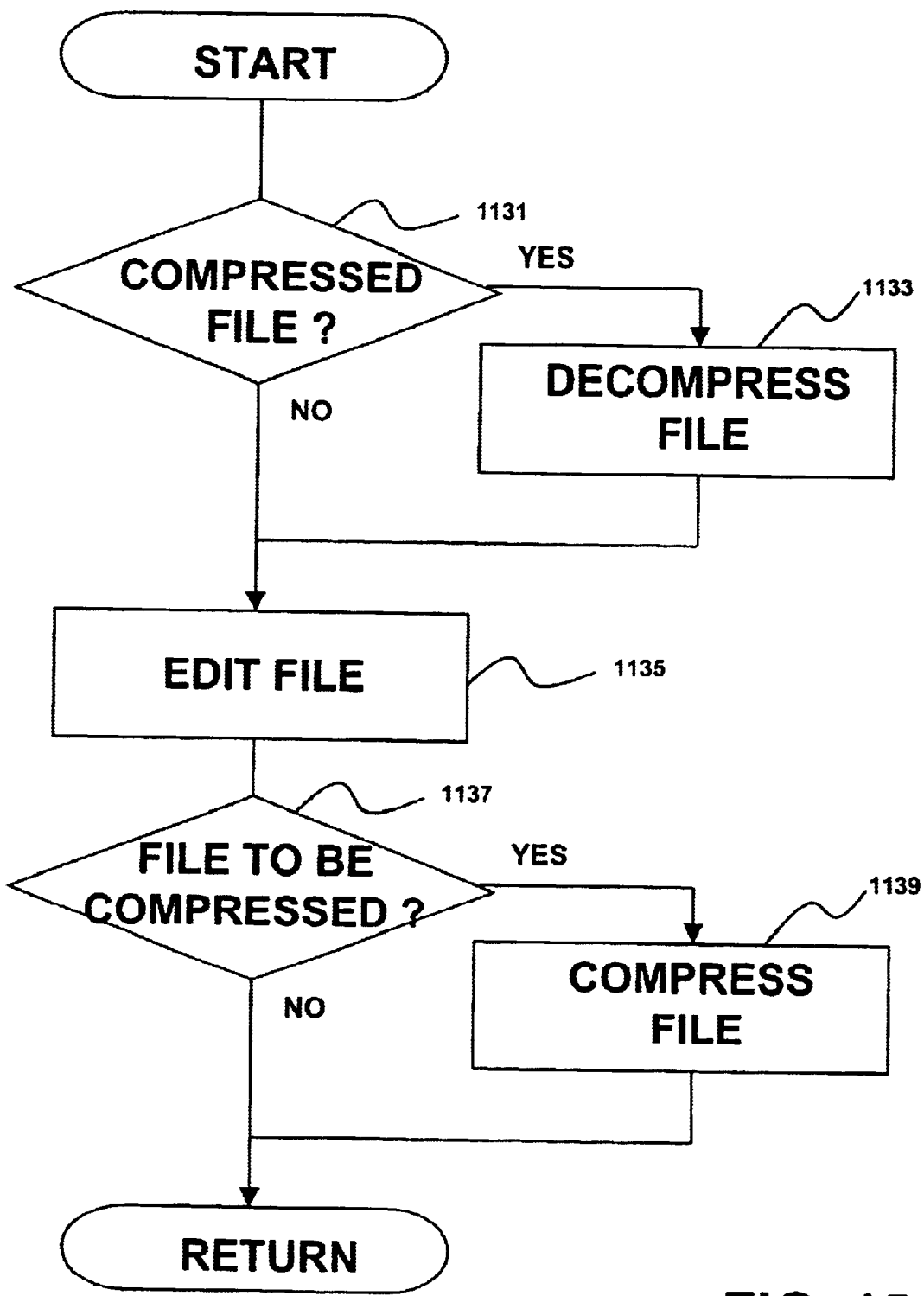
FIG. 15 is a flow chart of a process of editing a file which may have been compressed.

FIG. 15 is a process of editing a file which may have been compressed. The process in step 1131 determines whether the file has been compressed. If the file has been compressed, the process in step 1133 decompresses the file before editing it. The process in step 1135 edits an uncompressed file or a file that has been decompressed in step 1133. Once the editing is completed, the process in step 1137 determines whether the file is to be compressed. If the file is not to be compressed, the process returns. Otherwise, the process in step 1139 compresses the file, and then the process returns.

Figure 16:
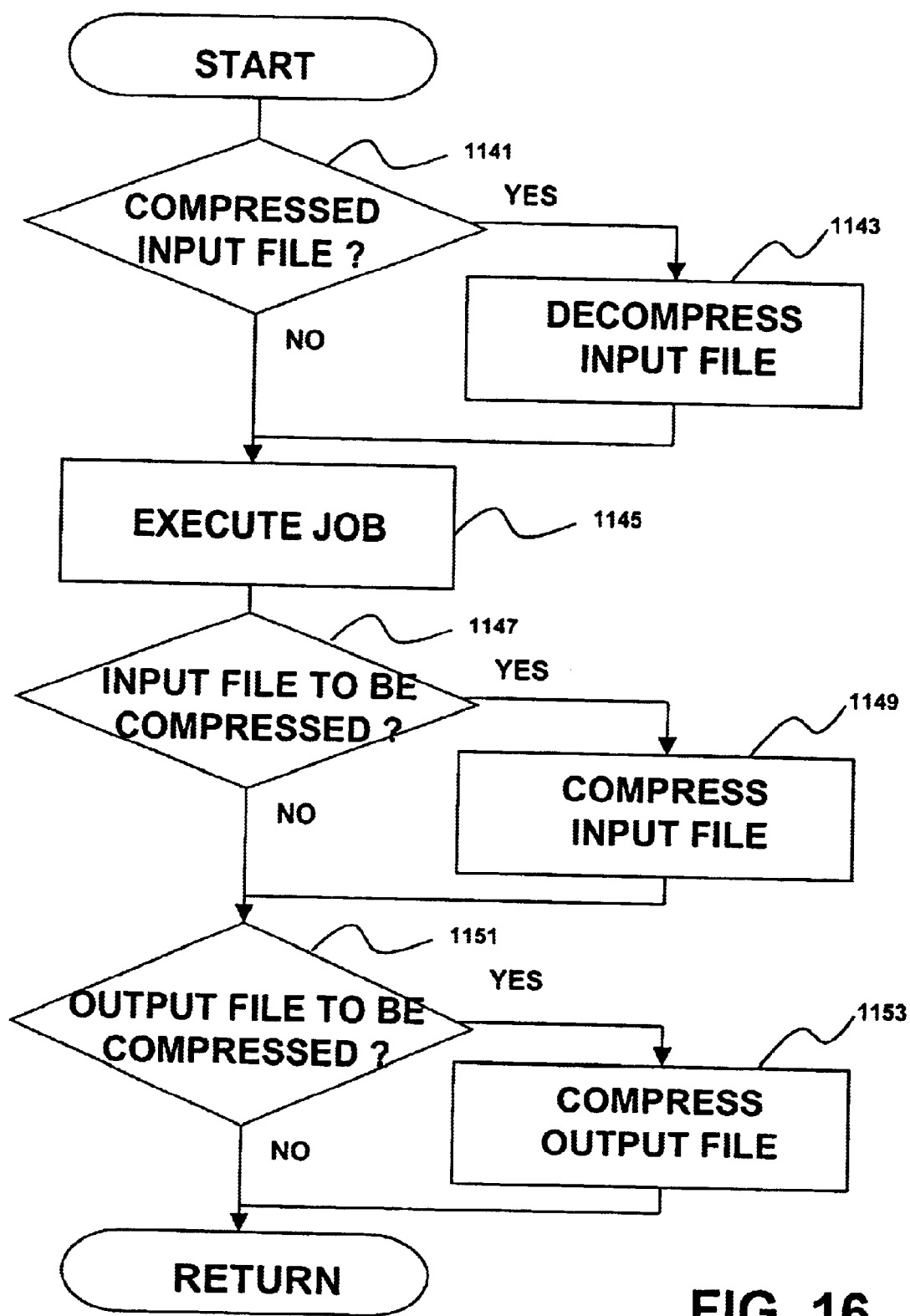
FIG. 16 is a flow chart of a process of executing a job to be included, for example, in a launch script.

FIG. 16 is a process of executing a job step where one or more input and output files may be compressed and/or decompressed. The process in step 1141 determines whether an input file has been compressed. If the input file has been compressed, the process in step 1143 decompresses the input file. The process in step 1145 executes the job using either the uncompressed input file or the decompressed input file. The step 1145 of the process may require multiple input files, some of which may have been decompressed.

The process in step 1147 determines whether any of the input files is to be compressed. If one or more input files are to be compressed, the process in step 1149 compresses these input files. The process in step 1151 determines whether any of the output files is to be compressed. If one or more output files are to be compressed, the process in step 1153 compresses these output files. The process returns after compressing the output files to be compressed, if any.

Sometimes multiple job steps are executed in an appropriate order. These multiple job steps comprise a chain job. Since decompressing and recompressing the same file several times during the execution of a chain job should be avoided, it is more difficult to implement automatic decompression and compression when a chain job is to be executed.

Figure 17:
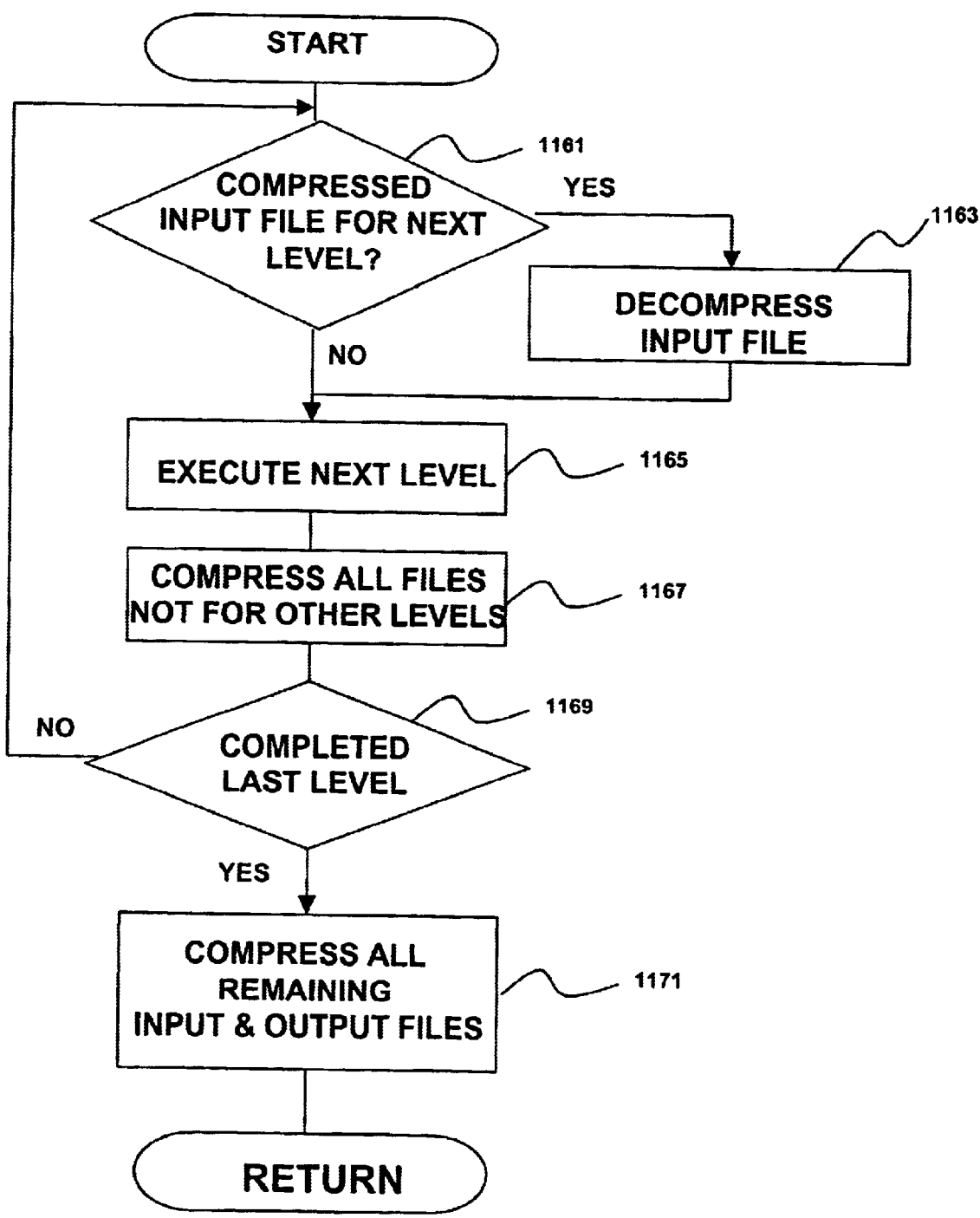
FIG. 17 is a flow chart of a process of executing a chain job with automatic compression and decompression.

FIG. 17 is a process of executing a chain job with automatic compression and decompression. The process in step 1161 determines whether any input file for a next level of the chain job has been compressed, starting with the first level. If one or more input file for the next level of the chain job has been compressed, the process in step 1163 decompresses the one or more input file. The process in step 1165 executes the next level of the chain job, starting with the first level.

After the next level of the chain job has been executed, the process in step 1167 compresses all input files any of the decompressed input files that are not to be used in other levels of the chain job. In addition, the process in step 1167 compresses all output files that are to be compressed and not to be used in other levels of the chain job. The process in step 1169 determines whether the last level of the chain job has been executed. If there are more levels of the chain job to be executed, the process proceeds to step 1161 and repeats steps 1163, 1165 and 1167 as needed for the next level of the chain job.

If the process in step 1169 determines that the last level of the chain job has been executed, the process in step 1171 compresses all remaining input files to be compressed and all remaining output files to be compressed.

C. Chip/Block Definition

For every chip, there is an associated web page that resides in the design server. The web page is typically known as a chip home page. The chip home page contains information regarding the associated chip. The chip home page also allows access to configuration changes for the associated chip. Similarly, each block of a particular chip is associated with a web page called a block home page. The block home page contains information regarding the associated block, and allows access to configuration changes for the associated block.

Figure 18:
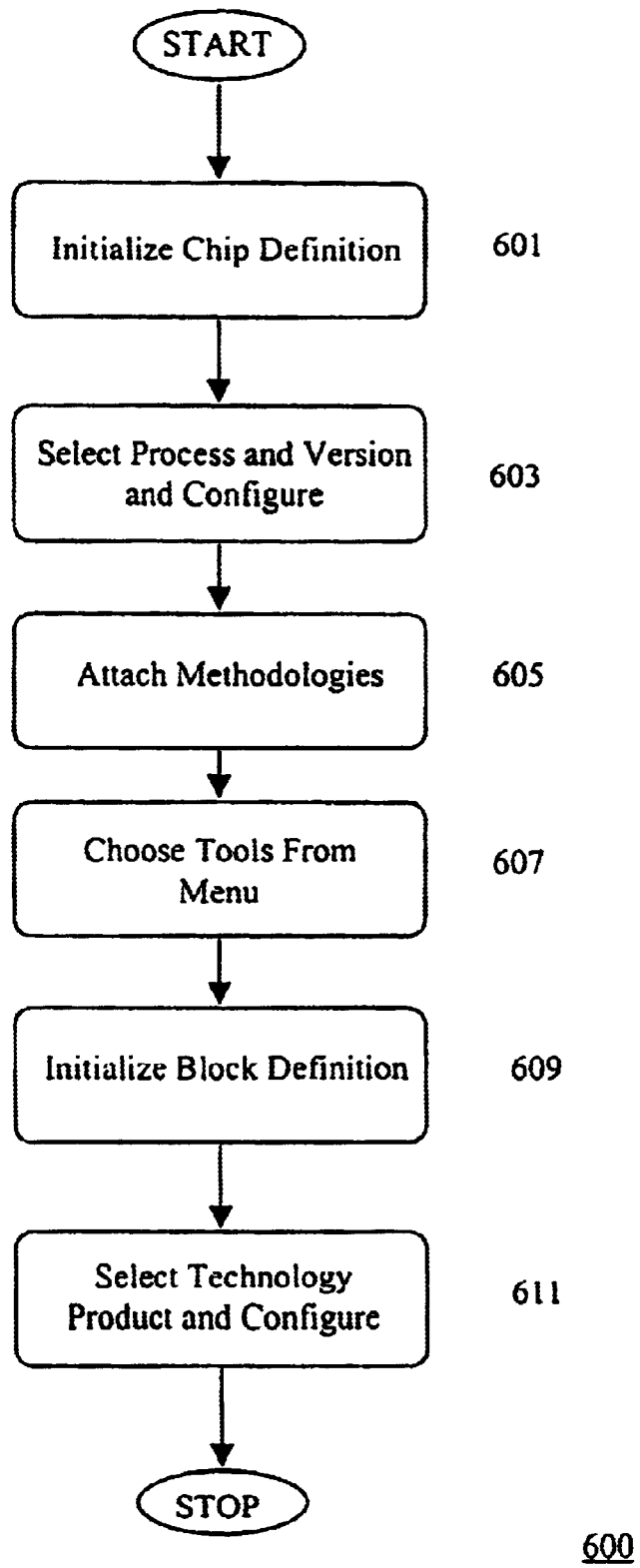
FIG. 18 is a flow diagram illustrating an embodiment of a process for creating a home page for a block or chip, including actions for preparing the block for methodology execution.

FIG. 18 is a flow diagram illustrating an embodiment of a process 600 for defining a block and a chip. During definition, the chip and block home pages provide a gateway for assigning the block its place in the hierarchy of the chip architecture, attaching methodologies to the corresponding chip and the block, and generally accessing information relating to the corresponding chip and the block.

An example of a chip home page is illustrated in FIG. 19, and an example of a block home page is illustrated in FIG. 20. In an embodiment of the invention, a chip home page of a particular chip is linked to a collection of blocks comprising the particular chip. The designer selects which methodologies to use for a chip and a block from the corresponding chip home page and the block home page, respectively. In an embodiment a block may not be designed independently of a chip, due to the need for a series of signal and power connections of the IC that define a container for a block.

Step 601 of the process 600 of FIG. 18 is the initialization of a chip definition. Information regarding the chip is viewed through the chip home page, which is used during chip definition. For example, as illustrated in FIG. 19, a chip home page includes the name of the chip, links to pages concerning the chip, methodologies, library search override definition of power groups, general information, tools and tool override. These parameters are assigned by a designer during chip definition. A chip home page also contains a list of the blocks in the chip, as well as the methodologies currently in use for the blocks. In addition, the chip home page includes other useful information, such as information required for a process.

In step 603 of the process 600, a process to be used for fabricating the chip and a version for the process is selected. Then the process is suitably configured for the chip. A single process generally applies to all blocks of a chip. Certain of the methodologies may only be available for certain specified processes, and versions of processes. For example, a methodology associated with a .35 micron technology process may be unsuitable for a process associated with a .25 micron technology process. Generally, the process is selected on a chip level basis. FIG. 21 illustrates a sample page showing available processes and their versions.

In step 605 of the process 600, methodologies are attached to the chip. The chip home page lists attached methodologies to the chip. Initially, the list of methodologies is empty. A designer uses the chip home page to attach the selected methodologies to the chip.

Each methodology generally has a corresponding tool selection menu. In one embodiment the chip home page allows for tool selection, and the selected tools become the default tools for all blocks referenced by the chip. In step 607 of the process 600, the designer of the chip selects tools from the tool selection menu after attaching the corresponding methodology to the chip.

The Common Gateway Interface (CGI) receives chip and block home page data from the engineering workstations to generate a block directory that appropriately processes the received data in the directory to activate to implement selected available tools. In the block directory the technology product is assigned a block for each configuration created. Additionally, the chip and block home page data may be saved into a database as well.

In step 609 of the process, a block definition is initialized. A block home page used during block definition includes the name of the block, a process used by the block, search path override, reference blocks (or child blocks), power groups, methodologies used on the block, a list of and an access to perform a tool override selection. The block home page also includes links regarding the chip, the block, general items, and tools. Selection of a tool on a block home page overrides any tool selection accomplished on the chip home page for that block.

In step 611 of process 600, a technology product is selected for a particular block. The technology product may be one of Field Programmable Gate Array (FPGA), standard cell and gate array or any other product suitable for the particular block. Once selected, the technology product may be configured. For example, configuring the technology product may comprise defining the number of metal layers.

D. Methodology Execution

Figure 22:
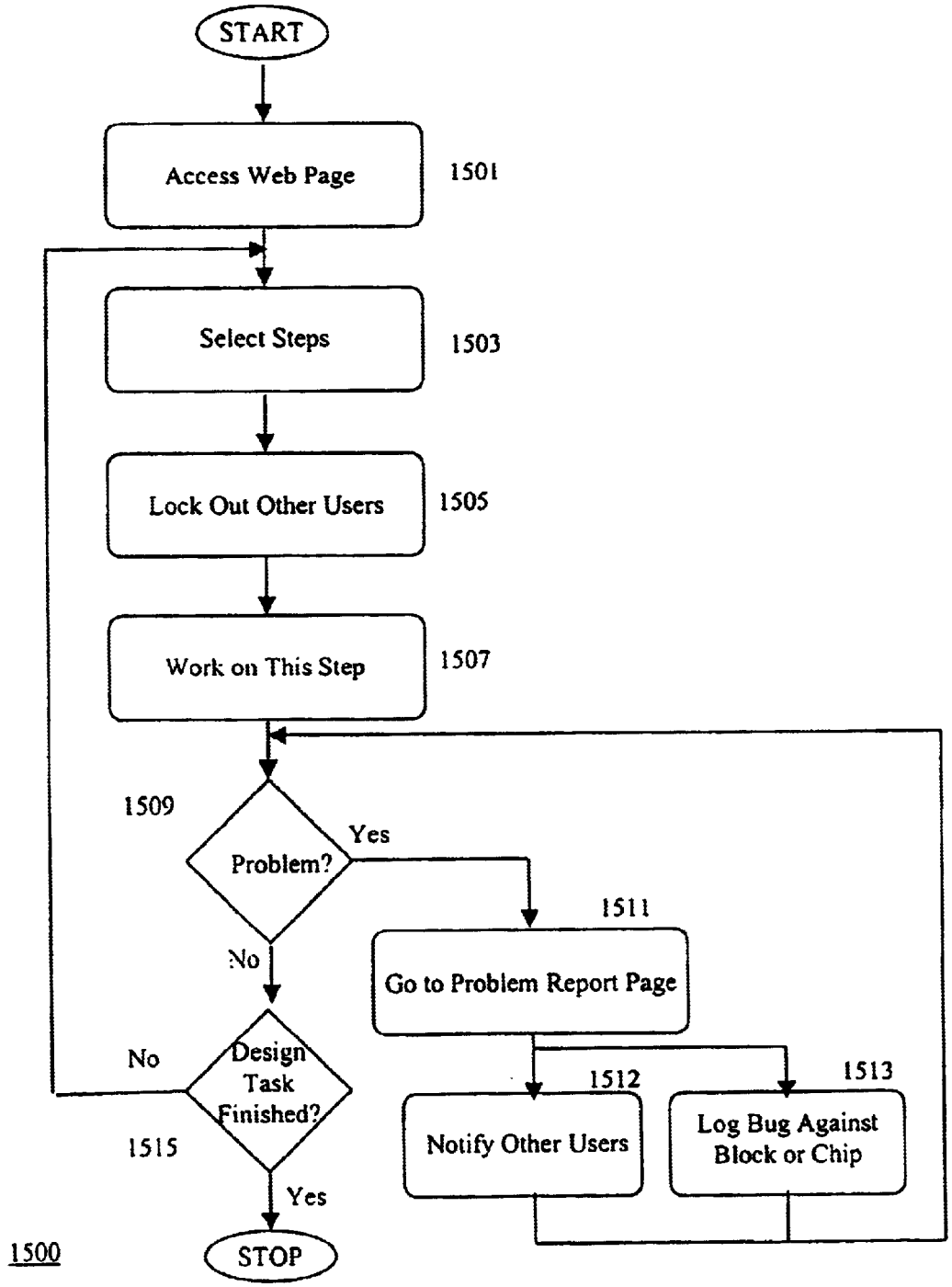
FIG. 22 illustrates a flow diagram of a process for executing a methodology.

FIG. 22 is a block diagram illustrating a process 1500 of designing a block by executing methodologies, i.e., design methodologies, using the interface and flow control tool. Once chip and block have been initialized and configured on the methodology server, they are accessible from any work station that has a browser. Thus, in step 1501 the block or chip home page is accessed to begin the design process.

Once the chip or block home page has been accessed, the designer determines the status of the design, and whether the task desired to be accomplished by the designer is ready to commence. When the designer selects a methodology from either a block home page or a chip home page, the web server runs a Common Gateway Interface (CGI) program associated with the selected methodology. The CGI program first displays an executable documentation file, i.e., HTML file fragment associated with the methodology. If the executable documentation file includes proper PERL programming, the CGI program may display programmed information on a methodology page. The designer may check the status of the work to determine what steps are currently being performed by others and what remains to be done.

In step 1503 of the process 1500, the designer selects a step from a list of steps available from the methodology page. The designer may select any step displayed on the methodology page. Each step is generally illustrated on the methodology page as a step name surrounded by a rectangular box.

FIG. 23 is a methodology page that illustrates a sample design flow for a methodology having multiple steps 1600. The illustrated design flow represents contents of the associated directed acyclic graph (DAG) that contains information on the names of the steps to be executed as well as the order of execution. The design flow includes multiple steps. Some of the steps are executable tools 1601, 1603, 1605, and some of the steps are output files 1607, 1609, 1611 which results from execution of the tools.

Arrows 1611, 1613 show dependencies between steps of the flow. Not all steps are executed sequentially. In other words, some of the steps may be executed in parallel. In the embodiment shown in FIG. 23, color of each box surrounding a step indicates the status of the step. For example, in the embodiment described, completed steps are of a first color 1615 and uncompleted steps are of a second color 1617. In other embodiments, a set of icons are provided for indicating step status. In addition, job steps are indicated with bold lines 1601, 1603, while other steps, such as the presence of output files, are not so indicated. In other embodiments, different step types are indicated by different graphic types.

By selecting one of the boxes, the user accesses the associated step for that block for that chip. In one embodiment, the associated step may define a chain job. In a chain job, due to dependencies in methodologies, the interface and flow control tool, on command, automatically queues and provide queue control for a number of job steps, ordering the job steps based on the flow of the methodology and waiting, as necessary, for the creation of required files.

FIG. 24 is a methodology step page 1700 that shows the result of selecting a file step. Selecting the file step causes the methodology step page to be displayed. The methodology step page provides documentation regarding the nature of the file step. In addition, the methodology step page corresponding to a file step includes an archive button and an edit button. The archive button is used to handle options associated with archiving files. The edit button is used to edit all files associated with the file step. Further, in one embodiment, the designer may click on the file name to download file step information to view on the designer's work station.

For example, the methodology step page of FIG. 24 displays information regarding a Verilog netlist file. In this particular embodiment, the methodologist has specified that this file may be edited. Thus, there is an edit button on the methodology step page. Therefore, the Verilog netlist file may be edited when the designer presses the edit button. FIG. 25 is the Verilog netlist file in an editor which is deployed as a pop-up window when the edit button is pressed.

Similarly, FIG. 28 illustrates a methodology step page displayed as a result of selecting an information step regarding power planning, which is implemented as a flow step. Power planning, alternatively referred to as floor plan based optimization, is a previously entered methodology to aid a designer in routing power and ground connections between blocks and to outside integrated circuit pins. In the floor plan based optimization, a methodologist enters power planning and routing guidelines as a methodology for a designer to follow in designing and laying out blocks on a chip. The floor plan based optimization a methodology guides the designer in placing and routing power. The power planning methodology is primarily intended as a set of design rules recorded to aid a designer in laying out the power and ground connections.

Returning now to FIG. 22, thus in step 1503 the interface and flow control tool provides for selection of a step or methodology. The designer may also make other selections at this step. The designer may opt for guided instructions, or recording of tool environment commands or the selective override of a tool at the block of chip level.

As previously discussed, selection of a step results in the web server providing the designer a page for that step. For a job step, if the job step is set for executing as a batch job on a compute server, the page includes a selection of a compute server. A selection of a compute server causes the web server to request execution of the batch job on the compute server.

Figure 30:
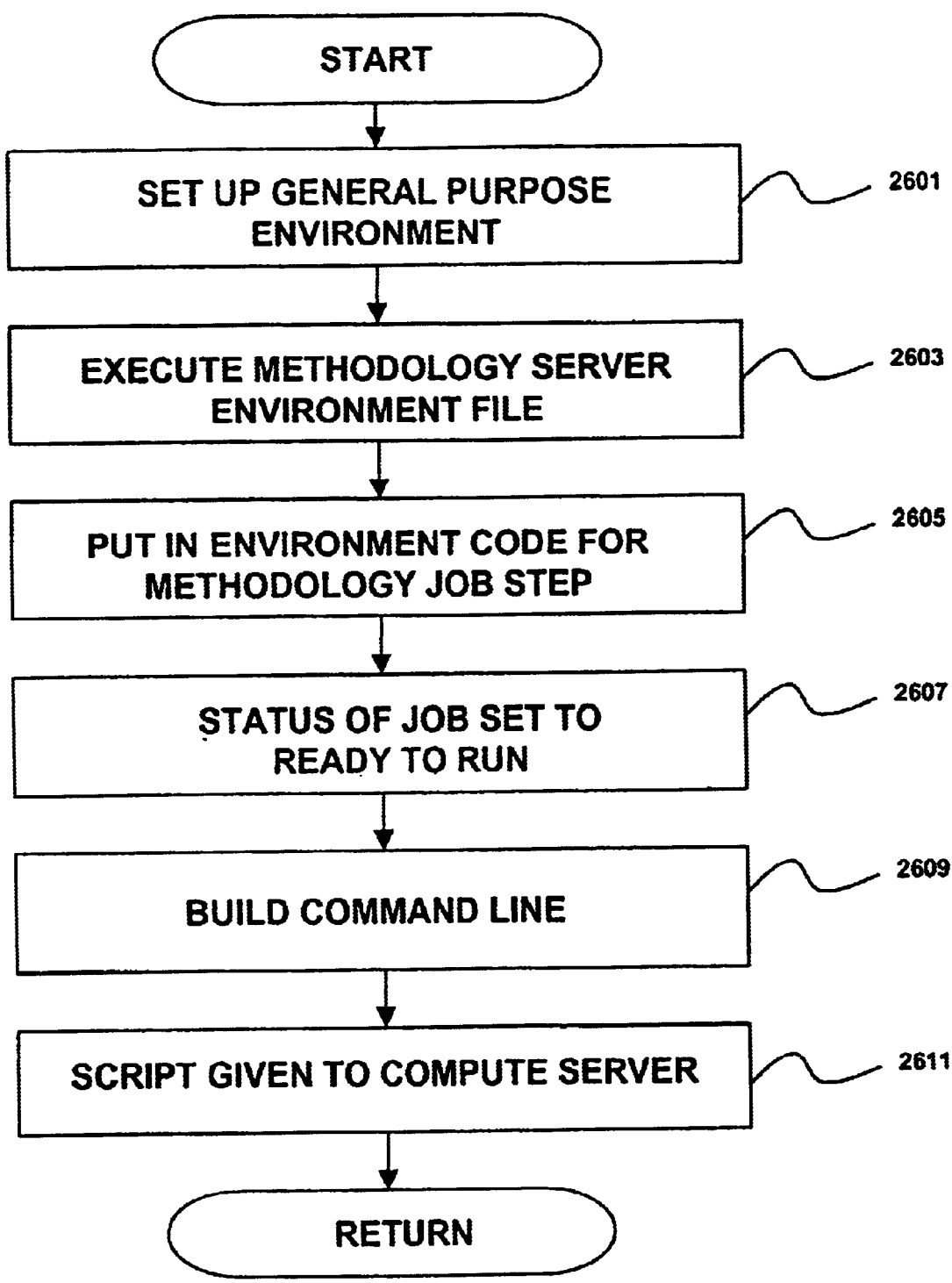
FIG. 30 is a flow diagram of an example of a job step execution.

In order to more fully describe aspects of the present invention, steps taken by the program on the web server to result in execution of the batch job on the compute server are discussed with reference to FIG. 30. FIG. 30 illustrates a process of providing for execution of a job step in batch mode. The process is executed at the methodology server. As the process executes in response to input from a web based input form, the process is a CGI program. In summary, the web server maintains information provided by methodologists during a capture of the methodology pertaining to the job step. The information includes a tool to be used, the location of files upon which the tool is to act, other parameters to be provided to the tool, and executable environment code for properly configuring the compute server for execution of the tool.

Accordingly, in step 2601 the process prepares a file to be provided to the compute server for execution on the compute server. The file includes general purpose environment variables, i.e. global variables, for configuring the compute server. The global variables are of a general nature, and are defined in a preset file on the methodology server. In step 2603 the process includes in the file values for environment variables stored in a second file on the methodology server. The values stored in the second file of the methodology server are unique to a specific methodology server, and allow for a methodology server administrator, for example, to additionally configure compute servers. In step 2605 the process examines the database, or specific files depending on the implementation, for the environment code provided by the methodologist. As previously discussed, during methodology capture the methodologist is able to determine the environment in which a job is to execute by including executable configuration code to configure a compute server. In step 2607 the process sets the status of the job as ready to run. The status of the job is used to display to designers the status of the design tasks. In step 2609 the process additionally examines the database, or the files depending on the implementation, to build a command line to execute the tool. The command line includes locations of files and the like as determined by the methodologist during methodology capture. In step 2611 the process transmits the file, which is an executable script, to the compute server to provide for execution of the job step. The process thereafter returns.

While a step of a methodology is being worked, the interface and flow control tool also prevents other designers from working on the step of the methodology. This occurs in step 1505 of the process, where other designers are locked out from accessing the same step.

During execution of "work on this step" in step 1507 of the process, the interface and flow control tool records tool execution status reports, and other items. Monitoring task performance provides many benefits. For example, if simulations using a particular tool begins to take an excessive amount of time, a problem with the tool or methodology may be indicated. Inquiry for the reasons for the long run time might be traced to a need for variations in the methodology for a particular design or to a problem associated with a tool.

The interface and flow control tool also provides for problem reporting. If the designer determines that a problem exists in step 1509 of the process, the designer may choose to access the problem reporting page in step 1511 of the process. The methodology server notifies other users of the existence of the problem in step 1512 of the process, or logs the problem against the block or chip on the design server in step 1513 of the process.

FIG. 26 shows an embodiment of a problem report page that is used to report problems encountered while engaged in the design process 1900. When a problem is found the designer clicks on the problem button 1901 shown in this embodiment. The problem button in this embodiment appears at the top of every web page. Problems may be logged against the tools, methodologies, blocks or chips. When noted against the tools and methodologies, the remote support teams will be notified. When problems are logged against blocks or chips this embodiment will alert the chip designers of problems in the progress of the design.

After the problem is logged against a block or chip on the design server, the problem tool or methodology generally must be remotely, i.e., not on this server, debugged. For debugging purposes, design data files that contain information about the problem are needed. Typically, designers manually locate the files that are likely to be relevant and bundle them up to deliver to developers who are responsible for analysis and correction of problems.

There may be some problems associated with requiring a designer to perform the file gathering task. First, the designer may fail to locate one or more of the input and output files that are associated with the step during which problem occurred. Second, the designer may select some files that are not relevant, causing confusion in the debugging process. Third, the designer may select the files that have correct names but without problem information because the selected files have not been taken at the right time to include information about the problem.

Figure 27:
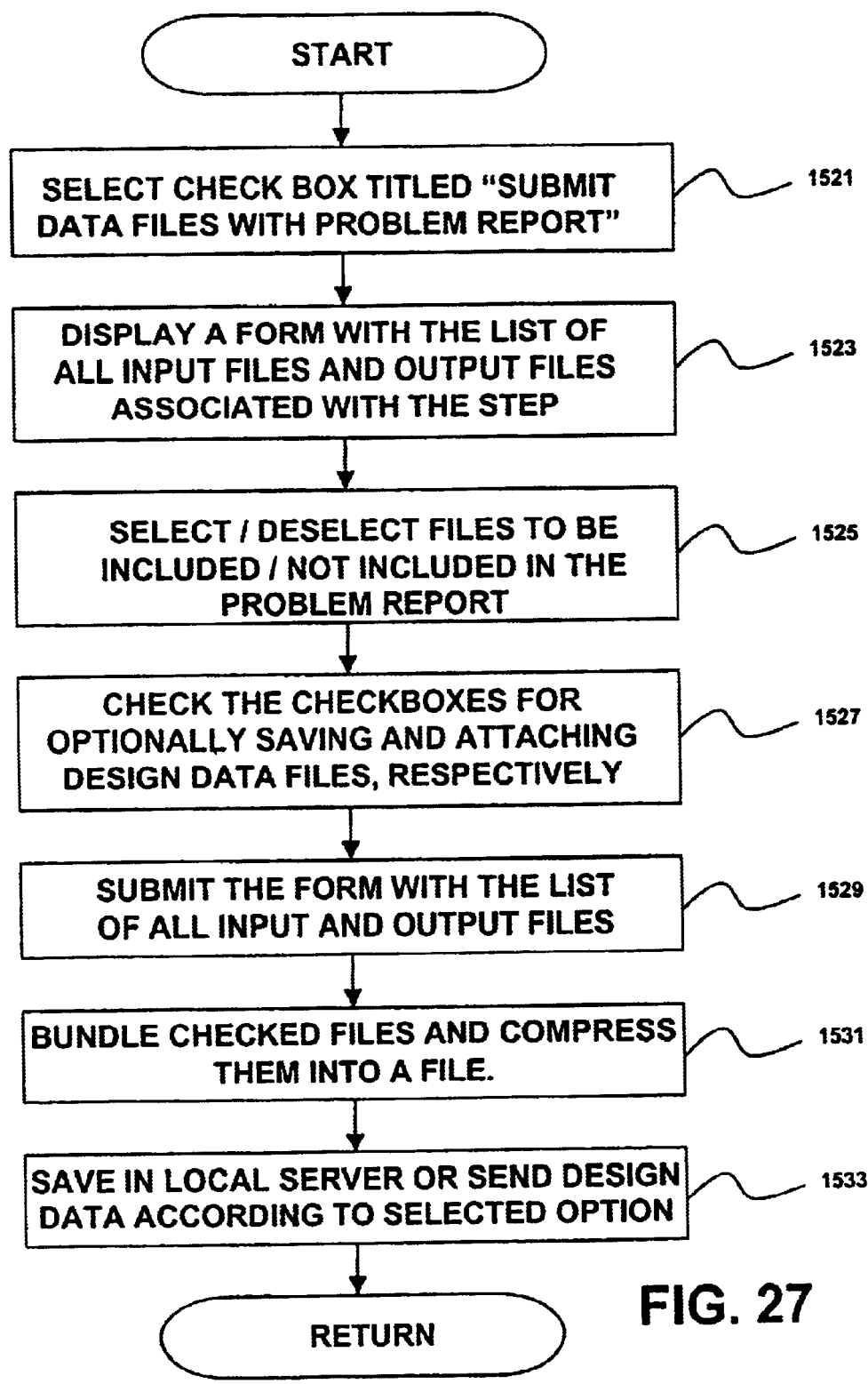
FIG. 27 shows an embodiment of a flow chart of a problem reporting process.

One embodiment of the present invention, therefore, includes a new problem reporting process for methodology steps that relieves designers from having to locate and bundle files that are relevant to the debugging process. FIG. 27 is a problem reporting process. The process in step 1521 allows a designer to mark a check box to indicate that data files are to be submitted with the problem report when the data files are desired along with the problem report. The check box is preferably available in a problem report form, which the designer fills in and submits for processing.

Once the problem report form for a particular step is submitted with the marked check box, the process in step 1523 displays a web page that contains a list of all input files and output files associated with the particular step. These input and output files include files from steps that point to the particular step and files from steps that the particular step points to. The process in step 1525 allows the designer to select the files that are to be included with the problem report and to deselect the files that are not to be included with the problem report.

The process in step 1527 may give the designer an option to save design data files in the local server's problem reporting area for archival purposes. The process in step 1527 may also give the designer an option to attach the design data files to the problem report. The problem report may be sent as an e-mail. The process in step 1529 allows the designer to submit the form on the web page, having a list of selected and deselected input and output files, for processing.

The process in step 1531 bundles the input and output files that have been selected and compresses them into a file. This bundle of files preferably includes chip info and block info files as well. The compression may be performed as a background task by a web server so that there is no timeout associated with the web page while waiting for the compression to take place.

The process in step 1533 performs file saving or sending in accordance with options selected by the designer in step 1527. If the designer has selected to save the design data files in the local server's problem reporting area, then the bundled design data associated with the problem report is saved into the problem reporting area and a problem report is e-mailed with indication that the bundled design data have been saved locally by the web server.

If the designer has selected to send the design data files as an attachment to the problem report, then the bundled design data is attached to the problem report and e-mailed. In this case, since the e-mail is to contain the bundled design data as an attachment, a UNIX process is preferably used to bundle and compress the design data files and not the web server process. Thus, in this case, the UNIX process, and not the web server process, preferably e-mails the problem report.

A bundling engine used for bundling is preferably a standard UNIX command tar, which is in the standard location /bin. The tar command is preferably not encapsulated into the integrated circuit design and fabrication system.

A compression engine comprises a compression executable that is preferably specified to be an encapsulated integrated circuit design and fabrication tool so that it can be invoked in a machine independent manner. This compression engine is to perform the compression of bundled design data in the web server. The name of the compression engine is preferably specified in the web server's configuration file. Thus, by modifying the configuration file, compression engines other than a standard compression engine may be selected.

When a problem report with an associated bundled design data is displayed, the problem report web page preferably includes a download link to the file containing the associated bundled design data. A designer who owns the problem preferably has an option to delete the file containing the associated bundled design data.

Returning now to FIG. 22, in step 1515, the process determines if the designer's design task is finished. If it is not finished, he selects the next tool and proceeds with the whole process again until finished. In alternate embodiments the designer may have a choice of tools whether the tools are from different manufacturers or different versions of the same tool. This gives the designer the freedom to try different tools or different versions of the same tool and compare the results obtained. When all the design tasks are finished, a designer stops work and the progress achieved by the designer is recorded on the design server. The system updates the access list to allow the next designer to log in and perform his required part of the design.

In addition, various pointers may be used to interlink methodologies, steps of methodologies and the location of the executables for those steps. Another alternate embodiment provides guided instructions to the designer as part of the methodology to increase the ease of execution of steps. In alternate embodiments, the methodologies do not all have to reside on the same methodology server. Work on some blocks may be split among several methodology servers.

Accordingly, the present invention provides a design environment. Although this invention has been described in certain specific embodiments, many additional modifications and variations would be apparent to those skilled in the art. It is therefore to be understood that this invention may be practiced otherwise than as specifically described. Thus, the present embodiments of the invention should be considered as illustrative and not restrictive, the scope of the invention to be indicated by claims and their equivalents supported by this application rather than the foregoing description.

What is claimed is:

1. An integrated design environment for the design of integrated circuits, the integrated circuits being comprised of blocks, comprising:
   a plurality of computers, the computers executing a browser for the display of pages including forms;
   at least one methodology server connected to the plurality of computers by a network, the methodology server including a page generator generating the pages including forms, the methodology server additionally including programs responsive to submission of information from the computers using the pages including forms; and at least one compute server connected to the network, the compute server including an electronic design automation tool, the compute server executing the electronic design automation tool in response to a request generated by a program resident on the methodology server, the program resident on the methodology server generating the request in accordance with a design methodology maintained by the methodology server.

2. The integrated design environment of claim 1 wherein the pages including forms include forms adapted for use in capturing methodologies.

3. The integrated design environment of claim 2 wherein the forms adapted for use in capturing methodologies include an input selection of a step type.

4. The integrated design environment of claim 3 wherein step types are comprised of any of flow steps, job steps, file steps, sub-methodology steps, branch steps, or information steps.

5. The integrated design environment of claim 4 wherein the pages including forms include methodology execution pages.

6. The integrated design environment of claim 5 wherein a given methodology's steps form a directed graph.

7. The integrated design environment of claim 6 wherein an information step is comprised of an executable script.

8. The integrated design environment of claim 7 wherein a job step includes an executable configuration script.

9. The integrated design environment of claim 2 wherein the forms adapted for use in capturing methodologies include a selection for marking compressible file steps and means for selecting a compression engine tool used during compression and decompression.

10. The integrated design environment of claim 1 wherein the network is an intranet.

11. The integrated design environment of claim 1 wherein the network is the Internet.

12. The integrated design environment of claim 1 wherein the methodology server and the workstations communicate using a Hypertext Transfer Protocol.

13. The integrated design environment of claim 1 wherein the programs responsive to submission of information from the computers are used to generate files that comprise a captured methodology.

14. The integrated design environment of claim 1 wherein the program resident on the methodology server comprises a CGI program for requesting the execution of the electronic design automation tool.

15. A method, of designing an integrated circuit comprised of blocks, comprising:
    attaching a design methodology to each block, the design methodology having steps, the steps including sub-methodologies; and
    executing the design methodology for each block.

16. The method of designing blocks for use in integrated circuit design of claim 15 wherein executing a methodology for designing a block comprises:
    executing a job using an input file to generate an output file.

17. The method of designing blocks for use in an integrated circuit design of claim 16 wherein the phase of executing a job comprises:
    decompressing the input file;
    executing the job using the decompressed input file to generate the output file;
    compressing the input file; and
    compressing the output file.

18. The method of designing blocks for use in an integrated circuit design of claim 15 wherein the phase of executing a methodology for designing a block comprises:
    executing a chain job using one or more input files to generate one or more output files.

19. The method of designing blocks for use in an integrated circuit design of claim 18 wherein the phase of executing a chain job comprises:
    decompressing the one or more input files;
    executing a first level chain job; and
    compressing the input files that are not going to be used to execute any other level chain jobs.

20. The method of designing blocks for use in integrated circuit design of claim 19 wherein the phase of executing a chain job further comprises:
    executing a next level chain job;
    compressing the input files that are not going to be in any other level chain jobs; and
    repeating the steps of executing a next level and compressing the input files that are not going to be used to execute any other level chain jobs until a last level chain job has been executed.

21. The method of designing blocks for use in an integrated circuit design of claim 20 wherein the phase of executing a chain job further comprises:
    compressing all remaining input files to be compressed; and
    compressing all output files to be compressed.

22. The method of designing blocks for use in an integrated circuit design of claim 15 further comprising:
    generating multiple files for executing the design methodology using an XML file containing information regarding the design methodology.

23. The method of designing blocks for use in integrated circuit design of claim 15 wherein the phase of executing a methodology for designing a block comprises:
    reporting problems encountered during execution of the methodology.

24. The method of designing blocks for use in an integrated circuit design of claim 23 wherein reporting problems comprises:
    creating a problem report concerning a step; and new line determining files associated with the step.

25. The method of designing blocks for use in an integrated circuit design of claim 24 wherein the reporting problems further comprises:
    bundling the files associated with the step and compressing the files associated with the step into a compressed file.

26. The method of designing blocks for use in an integrated circuit design of claim 25 wherein reporting problems further comprises:
    saving the compressed file in a local server.

27. The method of designing blocks for use in an integrated circuit design of claim 25 wherein reporting problems further comprises:
    automatically attaching the compressed file to the problem report and sending the compressed file together with the problem report.

28. The method of designing blocks using computers of claim 15 further comprising the generation of test data as a result of executing the design methodology for designing a block.

29. The method of claim 15 further comprising capturing the design methodology for each block.

30. The method of claim 29 further comprising generating metrics and reports.

31. The method of claim 29 further comprising generating data to generate semiconductor masks.

32. A method of designing blocks, the method including the association of methodologies with a block, comprising:
   determining methodologies for use in designing a block;
   entering the selection of methodologies into a database; and
   executing the methodologies using computers, the computers referencing the methodologies entered into the database.

33. A web based method for designing integrated circuits being comprised of blocks comprising:
   recording a design methodology for each block that includes data management, revision control, data accessibility and logistics; and
   attaching the design methodology for each block to each block, whereby automated documentation and scheduling are provided allowing concurrent engineering by multiple individuals or groups.

34. A computer system for designing blocks for use in an integrated circuit comprising:
   a methodology server storing methodologies comprised of steps;
   a user system connected to the methodology server, the user system selecting methodologies for a block; and
   a compute server connected to the methodology server and the user system, the compute server executing a step of a methodology.

35. The method of designing blocks for use in an integrated circuit design of claim 15 wherein the phase of capturing a design methodology comprises:
   determining which file steps are candidates for automatic compression and decompression;
   marking the determined file steps for compression and decompression; and
   automatically compressing and decompressing files associated with the marked determined file steps.

36. A design apparatus for the design of integrated circuits being comprised of blocks, comprising:
   a computer including a browser for displaying pages;
   a web server connected to the computer by a network, including a memory storing a design methodology for each block, page generator generating the pages based on the design methodology, and programs responsive to input from the computers displaying the pages.

37. An article of manufacture comprising a computer readable medium having computer usable program code that, when executed, cause a computer to perform the steps of:
   capturing a design methodology;
   attaching the design methodology to a block; and
   executing the design methodology for designing a block.

38. The method of designing blocks for use in an integrated circuit design of claim 16 wherein executing a job comprises:
   decompressing a plurality of input files;
   executing the job using the decompressed input files to generate a plurality of output files;
   compressing the decompressed input files; and
   compressing the plurality of output files.

39. The method of designing blocks for use in an integrated circuit design of claim 38 further comprising:
   determining a plurality of input files requiring decompression out of a superplurality of input files; and
   determining a plurality of output files available for decompression out of a superplurality of output files, the execution of the job generating the superplurality of output files.

40. A method of designing an integrated circuit comprised of blocks, comprising:
   capturing at least one design methodology for a plurality of the blocks of the integrated circuit, the design methodology having steps, the steps including sub-methodologies; and
   attaching the at least one design methodology to at the plurality of blocks.

41. The method of claim 40 wherein a plurality of design methodologies are captured.

42. The method of claim 41 wherein different design methodologies of the plurality of design methodologies are attached to different blocks of the plurality of blocks.

* * * * *